US011763109B2

(12) United States Patent
Nielsen et al.

(10) Patent No.: US 11,763,109 B2
(45) Date of Patent: Sep. 19, 2023

(54) ELECTRONIC STRUT MONITOR

(71) Applicant: Paratech, Incorporated, Frankfort, IL (US)

(72) Inventors: Kenneth E. Nielsen, Chicago, IL (US); William O. Teach, Frankfort, IL (US)

(73) Assignee: Paratech, Incorporated, Frankfort, IL (US)

( * ) Notice: Subject to any disclaimer, the term of this patent is extended or adjusted under 35 U.S.C. 154(b) by 7 days.

(21) Appl. No.: 17/582,864

(22) Filed: Jan. 24, 2022

(65) Prior Publication Data
US 2022/0237395 A1 Jul. 28, 2022

Related U.S. Application Data

(60) Provisional application No. 63/181,762, filed on Apr. 29, 2021, provisional application No. 63/142,331, filed on Jan. 27, 2021.

(51) Int. Cl.
*G01H 1/00* (2006.01)
*G01L 1/00* (2006.01)
*G06K 7/10* (2006.01)
*G06K 19/077* (2006.01)
*G08B 21/18* (2006.01)

(52) U.S. Cl.
CPC .......... *G06K 7/10366* (2013.01); *G01H 1/00* (2013.01); *G01L 1/005* (2013.01); *G06K 19/07758* (2013.01); *G08B 21/18* (2013.01)

(58) Field of Classification Search
CPC .................. G01L 1/2218; G01L 25/00; E21D 15/46–465; G01M 7/027; G01M 7/025; G01D 11/245
See application file for complete search history.

(56) References Cited

U.S. PATENT DOCUMENTS

| | | | | |
|---|---|---|---|---|
| 1,737,514 A | * | 11/1929 | Nikolish | E21D 15/46 340/690 |
| 3,594,773 A | * | 7/1971 | Conkle | E21D 15/46 340/690 |
| 3,662,596 A | * | 5/1972 | Siefert | G01L 1/2218 73/146 |
| 5,668,325 A | * | 9/1997 | Hart | G01B 7/16 73/818 |
| 5,979,218 A | * | 11/1999 | Biddle | G01L 5/1627 73/11.04 |

(Continued)

FOREIGN PATENT DOCUMENTS

CN 108798068 A 11/2018

OTHER PUBLICATIONS

Apr. 7, 2022—(WO) Partial International Search Report and Written Opinion—App PCT/US22/70331.

(Continued)

*Primary Examiner* — Tran M. Tran
(74) *Attorney, Agent, or Firm* — Banner & Witcoff, Ltd.

(57) ABSTRACT

A monitor configured to be removably coupled to a strut that forms part of a temporary support structure. The monitor may include an electronic monitoring device that includes a load cell. The monitor may be configured to be position in-line with strut and subject to the same forces exerted upon the strut. Further the monitor may be configured to wirelessly communicate the sensor information to a user.

18 Claims, 16 Drawing Sheets

(56) References Cited

U.S. PATENT DOCUMENTS

| | | | | |
|---|---|---|---|---|
| 6,957,166 B1* | 10/2005 | Howie | | G01G 21/23 |
| | | | | 702/173 |
| 7,496,454 B2* | 2/2009 | Rogers | | G01M 5/0025 |
| | | | | 702/33 |
| 8,474,331 B2* | 7/2013 | Pekin | | A01K 87/007 |
| | | | | 73/862.471 |
| 9,267,375 B2* | 2/2016 | Kashyap | | E21D 15/585 |
| 9,534,406 B2* | 1/2017 | Nielsen | | E04G 25/04 |
| 9,850,930 B2* | 12/2017 | Teach | | F16B 7/042 |
| 10,006,286 B2* | 6/2018 | Abreu | | G08B 3/10 |
| 10,125,608 B2* | 11/2018 | Moye | | E04G 23/04 |
| 10,225,629 B2* | 3/2019 | Lam | | G01M 5/0041 |
| 10,302,510 B2* | 5/2019 | Baker | | F04B 49/02 |
| 10,473,540 B2* | 11/2019 | Duvall | | G01L 1/2287 |
| 10,570,708 B2* | 2/2020 | Deacon | | E21B 47/09 |
| 10,801,593 B2* | 10/2020 | Nielsen | | F16H 19/04 |
| 11,306,492 B2* | 4/2022 | Chevis | | E04B 1/2403 |
| 11,573,208 B2* | 2/2023 | Spay | | G01N 29/262 |
| 2005/0103123 A1* | 5/2005 | Newman | | G01L 1/2218 |
| | | | | 73/862.045 |
| 2005/0155708 A1* | 7/2005 | Beginski | | H01L 21/67259 |
| | | | | 156/345.24 |
| 2009/0101774 A1* | 4/2009 | Shih | | E04G 25/065 |
| | | | | 248/200.1 |
| 2009/0251332 A1* | 10/2009 | Senogles | | H04Q 9/00 |
| | | | | 340/870.02 |
| 2011/0088489 A1* | 4/2011 | Yamamoto | | G01L 1/2218 |
| | | | | 73/862.627 |
| 2013/0043053 A1* | 2/2013 | Malorni | | B25B 13/50 |
| | | | | 173/217 |
| 2013/0126249 A1* | 5/2013 | Buttolph | | G01L 1/2218 |
| | | | | 177/211 |
| 2013/0146825 A1* | 6/2013 | Buckingham | | B66F 3/00 |
| | | | | 254/105 |
| 2015/0144762 A1 | 5/2015 | Lam et al. | | |
| 2015/0308474 A1 | 10/2015 | Teach | | |
| 2016/0273180 A1* | 9/2016 | Riggle, Jr. | | G08C 17/02 |
| 2016/0371957 A1* | 12/2016 | Ghaffari | | G08B 21/182 |
| 2017/0275994 A1* | 9/2017 | Moye | | E21D 15/20 |
| 2020/0299983 A1 | 9/2020 | Houston | | |
| 2022/0187156 A1* | 6/2022 | Lam | | E04G 11/56 |
| 2022/0364944 A1* | 11/2022 | Fuller | | G01L 1/16 |
| 2022/0382927 A1* | 12/2022 | Span | | G01M 5/0041 |

OTHER PUBLICATIONS

May 31, 2022—(WO) International Search Report and Written Opinion—App PCT/US22/70331.

* cited by examiner

ELECTRONIC STRUT MONITOR

CROSS-REFERENCE TO RELATED APPLICATIONS

This application claims the benefit and priority to U.S. Provisional Application Ser. No. 63/181,762, filed Apr. 29, 2021, and to U.S. Provisional Application Ser. No. 63/142,331, filed Jan. 27, 2021. The content of these applications is incorporated by reference herein in its entirety for any and all non-limiting purposes.

TECHNICAL FIELD

Aspects of this disclosure generally relate to a monitor configured to be removably coupled to a structure or strut that forms part of a temporary support structure.

BACKGROUND

A strut may be utilized to brace an unstable structure. For example, one or more struts may be positioned to brace an unstable structure of a vehicle following an accident. In another example, one or more struts may be positioned to reinforce damaged structures within a ship, such as bulkheads, sections of a hull, or hatches. In yet another example, one or more struts may be positioned to bear part, or all, of a weight of a wall, a ceiling, or a roof of an unstable structure. Accordingly, a strut may be utilized by emergency services, or other users, in time-sensitive situations and/or situations in which the types of on-hand materials are limited, and in which there is a possibility of/there has been structural failure of load-bearing elements.

The environments in which such struts are used are inherently dangerous. It would be beneficial if the structural condition of the unstable structure could be continuously monitored, optionally from a remote location.

Accordingly, a need exists for an electronic monitor configured to monitor the structural conditions of a structure or a strut that is part of a bracing system.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of this innovation relate to an in-line electronic monitor for a temporary support strut. The electronic monitor may be referred to as an electronic strut monitor. In other examples, the electronic monitor may be configured to be operable when coupled to other structural elements/structure types. For example, the electronic monitor may be coupled to a clamp that is, in turn, coupled to an unstable structure.

The in-line electronic strut monitor may include a housing that has a first end with a first bore extending into the housing and a second end spaced apart from the first end along an axial length. The electronic strut monitor may additionally include a first coupling mechanism at the first end that is configured to removably couple the first end of the housing two a first end of a temporary support strut. The electronic strut monitor may additionally include a second coupling mechanism at the second end of the housing, with the second coupling mechanism having a cylindrical shaft with a circumferential channel configured to be received into a corresponding bore of an external attachment structure. The electronic strut monitor may additionally include a third coupling mechanism that is positioned on a side wall that extends along a portion of the housing between the first end and the second end. The electronic strut monitor may also include a monitoring device that is positioned within the housing, with the monitoring device having a load cell configured to measure at least a portion of a force exerted upon the first coupling mechanism by the removably coupled temporary support strut. The electronic strut monitor may also have an electronic interface that is configured to communicate information about the force measured by the load cell to a user.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosures are illustrated by way of example and not limited in the accompanying figures in which like reference numerals indicate similar elements and in which:

FIG. 14 schematically depicts a monitoring device, according to one or more aspects described herein.

FIG. 15 is a flowchart diagram that may be executed by the monitoring device of FIG. 14, according to one or more aspects described herein.

Further, it is to be understood that the drawings may represent the scale of different elements of one single embodiment; however, the disclosed embodiments are not limited to that particular scale.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized, and structural and functional modifications may be made, without departing from the scope and spirit of the present disclosure. It is to be further understood that any of the embodiments described throughout this disclosure may be constructed from one or more material types, including metals, alloys, fiber-reinforced materials, ceramics, polymers, or combinations thereof.

Figure 1:
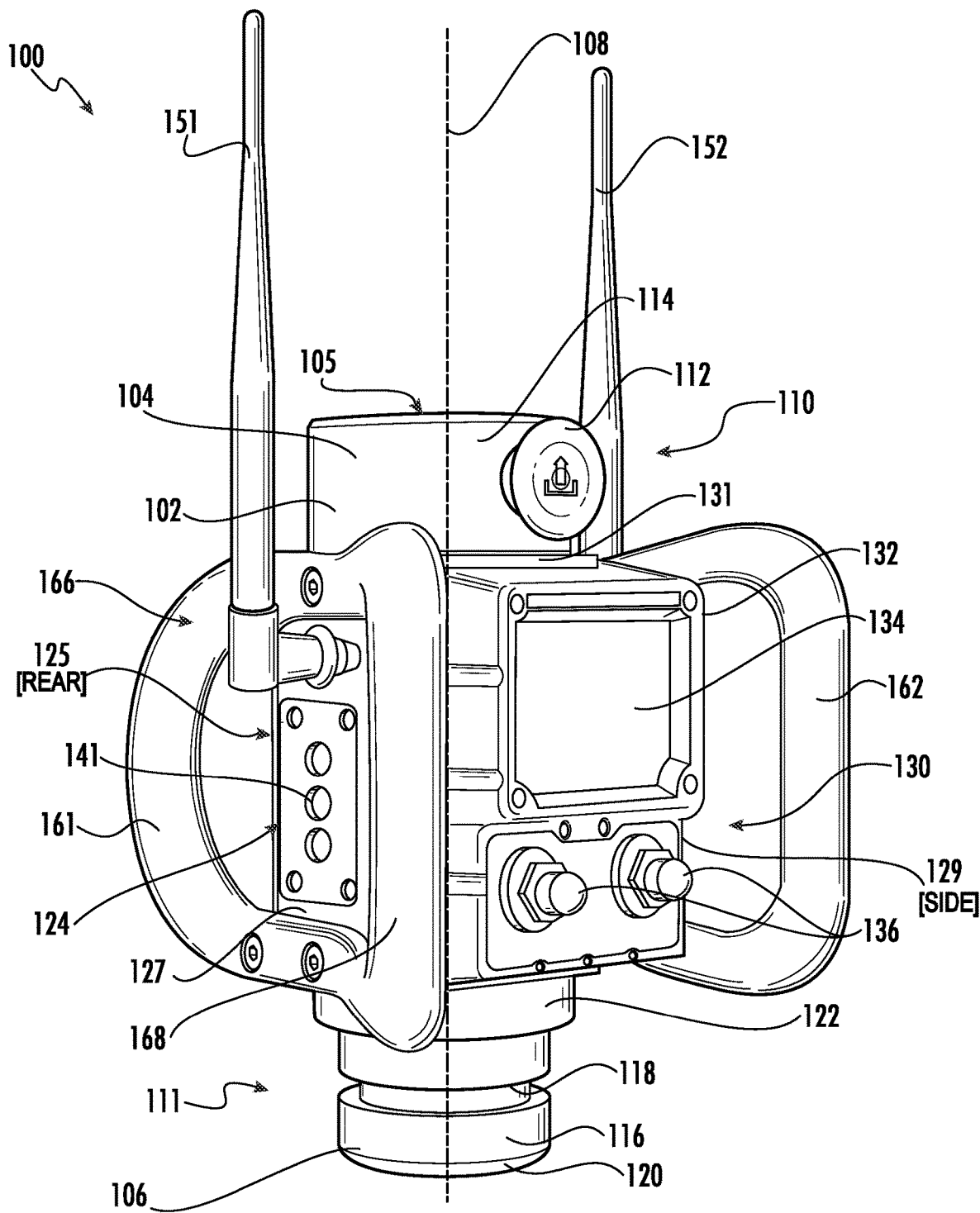
FIG. 1 depicts an in-line electronic strut monitor that is configured to be removably coupled to a temporary support strut, according to one or more aspects described herein.

FIG. 1 depicts an electronic monitor device 100. The electronic monitor device 100 may be referred to as an electronic monitor 100, an electronic strut monitor 100 or an in-line electronic strut monitor 100. In certain examples, the electronic monitor 100 may be configured to be removably coupled to a temporary support strut, according to one or more aspects described herein. The electronic monitor 100 may also be configured to be operable when coupled to other structural elements/structure types. For example, the electronic monitor may be coupled to a clamp that is, in turn, coupled to a structure, such as an unstable structure.

The in-line electronic strut monitor 100 may otherwise be referred to as monitor 100 throughout this disclosure, and may include a housing 102. This housing 102 may be configured to be positioned within a structural support system, and as such, may have structural geometries and materials configured to withstand external forces exerted upon the housing 102 from one or more structural members to which the monitor 100 is removably coupled. In the depicted example of FIG. 1 the housing 102 may have a first end 104 spaced apart from a second end 106 along an axial length that is schematically depicted as axial length 108/ axial direction 108. The first end 104 may have a first bore 105 that extends at least partially into the housing 104 and is configured to receive a first end of an external temporary support strut (not depicted in FIG. 1). In the depicted implementation of FIG. 1, the housing 102 has one or more cylindrical geometries configured to the attached to external cylindrical temporary support strut elements. As such, the schematic axial length 108 may extend through a center of these cylindrical structures. However, the various disclosures described herein related to an in-line electronic strut monitor 100 may utilize a housing with alternative geometries. These alternative geometries may be configured to removably couple the housing 102 to temporary support strut elements with non-cylindrical geometries, such as other prisms, cuboids, among others. It is contemplated that the housing 102 may be constructed from one or more metals, alloys, polymers, ceramics, or fiber-reinforced materials. In one example, the load-bearing components of the housing 102 may be constructed from an aluminum alloy.

The monitor 100 may additionally include a first coupling mechanism 110 at the first end 104. In one example, the first coupling mechanism 110 may comprise a spring-loaded catch 171 (depicted in FIG. 13) that extends into the bore 105 and is configured to interact with a circumferential channel extending around a portion of a first end of an external temporary support strut that is received into the bore 105. The spring-loaded catch 171 that extends into the bore 105 may be implemented with a geometry such that when a first end of a temporary support strut is received into the bore 105, the spring-loaded catch 171 is urged back into a side wall of the housing 102 without requiring the pull button 112 on an external sidewall 114 of the first end 104 of the housing 102 to be manually actuated. In other examples, the pull button 112 may be manually actuated in order to receive an external support strut into the first coupling mechanism 110. In one example, in order to actuate the first coupling mechanism 110, the pull button 112 is manually pulled away from the side wall 114, which retracts the spring-loaded catch 171 within the bore 105 back into the side wall 114 of the housing 104. The coupling mechanism 110 may be implemented such that an internal spring urges the catch 171 out of the side wall 114 and into the bore 105 when a manual force is not applied to pull the pull button 112 away from the side wall 114.

The second end 106 of the housing 102 may include a second coupling mechanism 111. The second coupling mechanism 111 may include geometrical features configured to be received into a coupling mechanism similar to that of the first coupling mechanism 110. As such, the monitor 100 may be compatible with/removably coupled with similar structures to those that the temporary support strut is configured to be compatible with. Accordingly, the geometries of the second coupling mechanism 111 may be similar to the geometries of a first end of a temporary support strut (not depicted) that is configured to be received into the first coupling mechanism 110. Specifically, the second coupling mechanism 111 may have a cylindrical structure 116/cylindrical shaft 116 with a diameter configured to be received into a bore with a bore geometry similar to that of bore 105. The second coupling mechanism 111 may additionally include a circumferential channel 118 that extends around a circumference of the cylindrical shaft 116. This circumferential channel 118 may be configured to interact with a catch structure of a coupling mechanism, similar to the catch 171 attached to the pull button 112 of the first coupling mechanism 110. Accordingly, the catch structure is configured to be received into the channel 118, and thereby prevent the cylindrical shaft 116 from translating along the axial direction 108. The second coupling mechanism 111 additionally includes a chamfered/filleted surface 120 configured to guide the cylindrical shaft 118 into a receiving bore similar to bore 105.

The housing 102 may have a cylindrical outer sidewall 114 adjacent to the first end 104 and cylindrical outer sidewall 122 adjacent to the second end 106. In addition, the housing 102 may include a substantially cuboidal structure 124 spaced between the first end 104 and the second end 106. This substantially cuboidal structure 124 of the housing 102 may include planar outer sidewalls. A first sidewall 125 may include a third coupling mechanism 170 (depicted in greater detail in FIG. 9).

The geometries of the strut elements that are configured to be received into the first coupling mechanism 110 and to which the second coupling mechanism 111 is configured to attach are described in further detail in U.S. Pat. No. 9,850,930, filed Apr. 15, 2015, the contents of which are incorporated herein by reference in their entirety for any and all non-limiting purposes.

The housing 102 may additionally include a monitoring device 130. Monitoring device 130 may include external elements visible on the exterior of the monitor 100, and internal elements within the housing 102. In one example, the monitoring device 130 includes a load cell configured to measure a force exerted on the first coupling mechanism 110. This force may be exerted by an external structure on the coupling mechanism 110. In one example, the external force may be exerted by a removably coupled temporary support strut, a first end of which is securely and removably coupled within the first coupling mechanism 110. In one example, the load cell of the monitoring device 130 is configured to measure at least a portion of a compressive load (force) exerted on the housing 102 and/or on the first coupling 110. As such, a total force exerted on the monitor 100 may be extrapolated based upon knowledge of the geometry of the load cell relative to the first coupling mechanism 110 as a whole. In another example, the load cell of the monitoring device 130 may be subjected to a full load/force exerted by an external structure upon the housing 102 of the monitor 100. The load cell of the monitoring device 130 may utilize any load cell configuration and/or materials without departing from the scope of these disclosures. Further, the load cell of the monitoring device 130 may be configured to measure a compressive force and/or a tensile force exerted on the in-line electronic strut monitor 100. In another example, the load cell of the monitoring device 130 may be configured to measure a torsional force exerted on the in-line electronic strut monitor 100.

The monitoring device 130 may additionally include an inclination sensor configured to monitor an angle of the in-line electronic strut monitor 100. As such, the inclination sensor may be configured to measure an angle of the axial direction 108 relative to level ground or an axis normal to level ground (corresponding to a direction of a force of gravity). The inclination sensor may thereby be configured to monitor a tilt angle of a structural member, such as a temporary support strut to which the monitor 100 is removably coupled. Those of ordinary skill in the art will recognize that monitoring of a tilt angle of a temporary support strut may be useful in providing an early indication/warning of a possible collapse of a temporary support structure. Additionally or alternatively, the monitoring device 130 may include a vibration sensor configured to detect a magnitude and/or frequency/energy content of vibrations to which the housing 102 of the monitor 100 is subjected. Those of ordinary skill in the art will recognize that monitoring of vibration may be used to detect an early indication/warning of a possible collapse of a temporary support structure. This vibration monitoring may be used to detect ongoing seismic activity, such as aftershocks, in an area that has experienced an earthquake. The inclination sensor and/or vibration sensor may be implemented using a multi-axis inertial chip positioned within the monitoring device 130. This inertial chip may include an accelerometer and/or a gyroscope sensor. It is contemplated that any inertial chip technologies may be utilized, without departing from the scope of these disclosures. These technologies may include piezoelectric elements, among others.

The housing 102 may additionally include a second sidewall 127 that is opposite to a third sidewall 129. A fourth sidewall 131 is opposite the first sidewall 125. Monitoring device 130 may include a monitoring device housing 132 that is rigidly coupled to the fourth sidewall 131. This monitoring device housing 132 may be constructed of any durable material, such as one or more polymers, with said materials configured to withstand incidental contact as the monitor 100 is used within various rescue situations. It is contemplated that the housing 132 may have any geometrical shape. In one example, the housing 132 includes an electronic interface that may include a graphical interface/screen/electronic display 134, and/or input knobs/buttons/joysticks 136, otherwise referred to as inputs 136. The screen 134 may be a touchscreen or may be interacted with through the inputs 136. In one example, the inputs 136 may be configured to activate, deactivate, and/or adjust various settings of the monitoring device 130.

The housing 102 may additionally include a visual beacon 141. This visual beacon 141 may include multiple high-intensity lights, which may be light emitting diodes (LEDs). This visual beacon 141 may be positioned on both the second side wall 127 and the third sidewall 129. Further, the visual beacon 141 may be actuated based upon a sensor reading from one or more of the sensors of the monitoring device 130. In addition, the monitoring device 130 may include an audible beacon/siren/alarm that may be configured to output an audible indication that the monitoring device 130 has detected a sensor reading above a predetermined threshold. This predetermined threshold may be associated with a safety threshold of load, angle, or vibration to which the housing 102 is subjected. Collectively, the visual beacon 141 and the audible beacon may be referred to as alert indicators, and may utilize any pattern of lighting and/or sound to alert users within the vicinity of the monitor 100 of a load, a tilt angle, and/or a vibration energy that is above one or more threshold values, or has changed by a threshold amount from set point values set when the monitoring device 130 was installed within a temporary support structure, among others. Additionally, the alert indicators may be configured to indicate that the monitor 100 is running low on battery power, or that the monitor 100 has not been correctly installed within a support structure.

In one example, the monitoring device 130 may be configured to communicate sensor readings and/or receive setting information from a remote device. Accordingly, the monitoring device 130 may be configured with one or more transceivers configured to facilitate wireless communication between the monitoring device 130 and one or more remote devices, which may include mobile phones, tablets, laptop computers, and the like. It is contemplated that the monitoring device 130 may be configured with the software, firmware, and/or hardware configured to communicate wirelessly using one or more communication protocols, including any Bluetooth®, and/or any Wi-Fi protocol, among others. The monitoring device 130 may utilize antennae 151 and 152 to facilitate wireless communication. In another example, the monitoring device 130 may utilize a single antenna of the antennae 151 and 152, and/or an internal antenna/antennae to facilitate wireless communication to one or more remote devices. Additionally or alternatively, the monitoring device 130 may be configured with software, firmware, and/or hardware to facilitate wired communication between the monitoring device and one or more remote devices. This wired communication may utilize any wired transmission protocol. It is further contemplated that the monitoring device 130 may include a power supply in the form of one or more batteries configured to provide electrical energy to the multiple components of the monitoring device 130 for a prolonged period of time (e.g. one or more weeks) without requiring the monitoring device 130 to be connected to a wired power source. In one example, the monitoring device 130 may include a port configured to receive a wired power source for recharging of the onboard energy storage batteries of the monitoring device 130. The batteries of the monitoring device 130 may, alternatively, be disposable and user-replaceable, and may use any number and/or type of batteries.

The monitor 100 additionally includes a first handle structure 161 rigidly coupled to the second side wall 127, and a second handle structure 162 rigidly coupled to the third sidewall 129. In one example, the first handle structure 161 may be similar to the second handle structure 162. The first handle structure 161 may include a closed-loop structure configured to prevent the electronic display 134 and/or the monitoring device housing 132 from being accidentally impacted by an external surface. In one example, the first handle structure 161, when rigidly coupled to the second sidewall 127, forms a first sub-handle 166 that extends outward from both the first sidewall 125 and the second sidewall 127. The first handle structure 161 may additionally form a second sub-handle 168 that extends from both the second sidewall 127 and the fourth sidewall 131. The first handle structure 161 and the second handle structure 162 may be formed, partially or wholly, from a molded urethane. In another example, the first handle structure 161 and the second handle structure 162 may be formed, partially or wholly, from a rigid metallic and/or polymeric core that is overmolded with a rubberized material. The external surface of the first handle structure 161 and the second handle structure 162 may be configured to add additional grip for manual positioning of the monitor 100 and/or prevent sparking if the monitor 100 is accidentally knocked against an external surface.

Figure 2A:
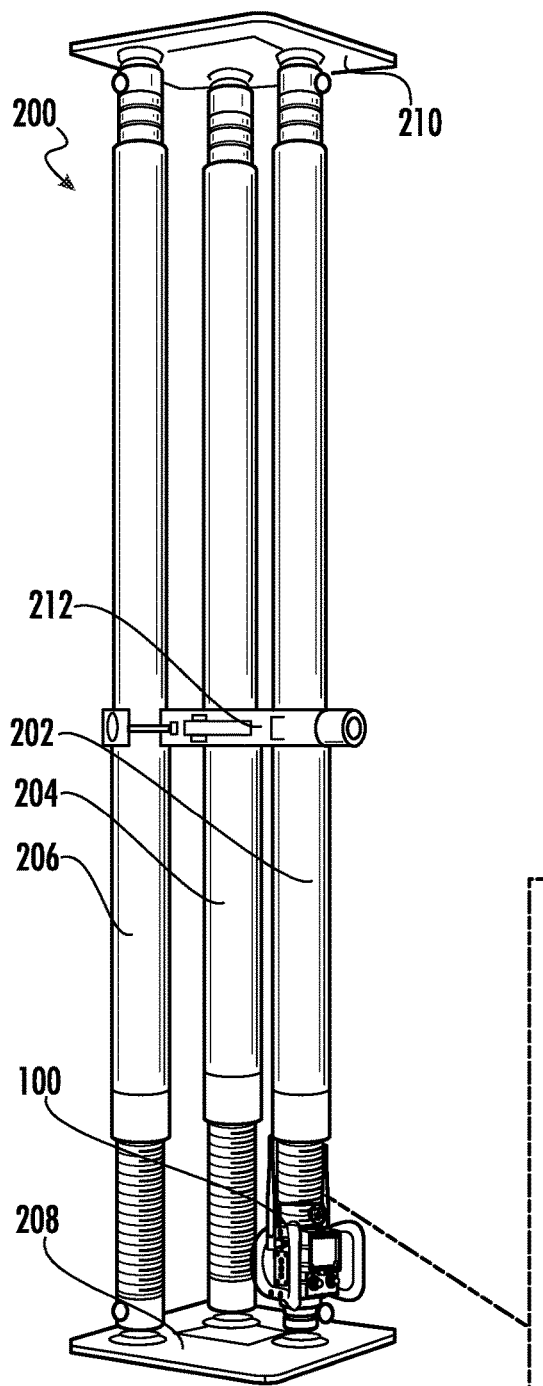
FIGS. 2A-2B depict the in-line electronic strut monitor of FIG. 1 installed in one example of a temporary structural support configuration, according to one or more aspects described herein.
Figure 2B:
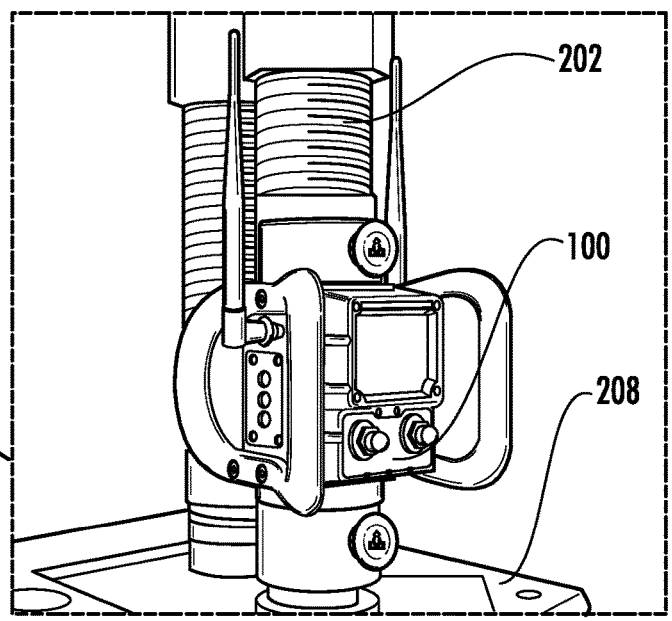

FIG. 2A depicts the in-line electronic strut monitor 100 installed in one example of a temporary structural support configuration 200, according to one or more aspects described herein. FIG. 2B depicts a closer view of the in-line connection of the monitor 100 between a temporary support strut 202/adjustable strut 202 and a base plate 208. In the depicted configuration of FIG. 2A, the adjustable strut 202 is one of three similar struts 202, 204, 206. However, struts 204 and 206 have been adjusted to a height that is different to strut 202 in order to accommodate the height of the monitor 100. In the depicted configuration 200, the struts 202, 204, and 206 are configured to be compressed between base plates 208 and 210 and clamp 212 is configured to maintain a spacing between struts 202, 204, and 206. Each of the struts 202, 204, and 206 will be subjected to one third of a total compressive force between plates 208 and 210. Further, because the monitor 100 is placed in-line between the strut 202 and the base plate 208, the monitor 100 will be subjected to all of the same compressive force to which the strut 202 is subjected. In this example configuration 200, a total compressive load between the base plates 208 and 210 may be calculated by multiplying by three the compressive load calculated by the monitor 100. It is contemplated that the monitor 100 may be utilized to detect sudden changes in a load, and the total stress between plates 208 and 210 may be of less importance to a user. Additionally, the monitor 100 may be configured to detect an angle of inclination of the strut 202, which may alert a user if the strut 202 appears to be leaning outside of a vertical plane. This specific scenario may represent a potential risk of collapse of a structure that is being supported by the struts 202, 204, and 206. Similarly, the monitor 100 may be configured to monitor vibration within the support configuration 200, which may provide a user with an early indication of a potential failure/collapse event.

Figure 3:
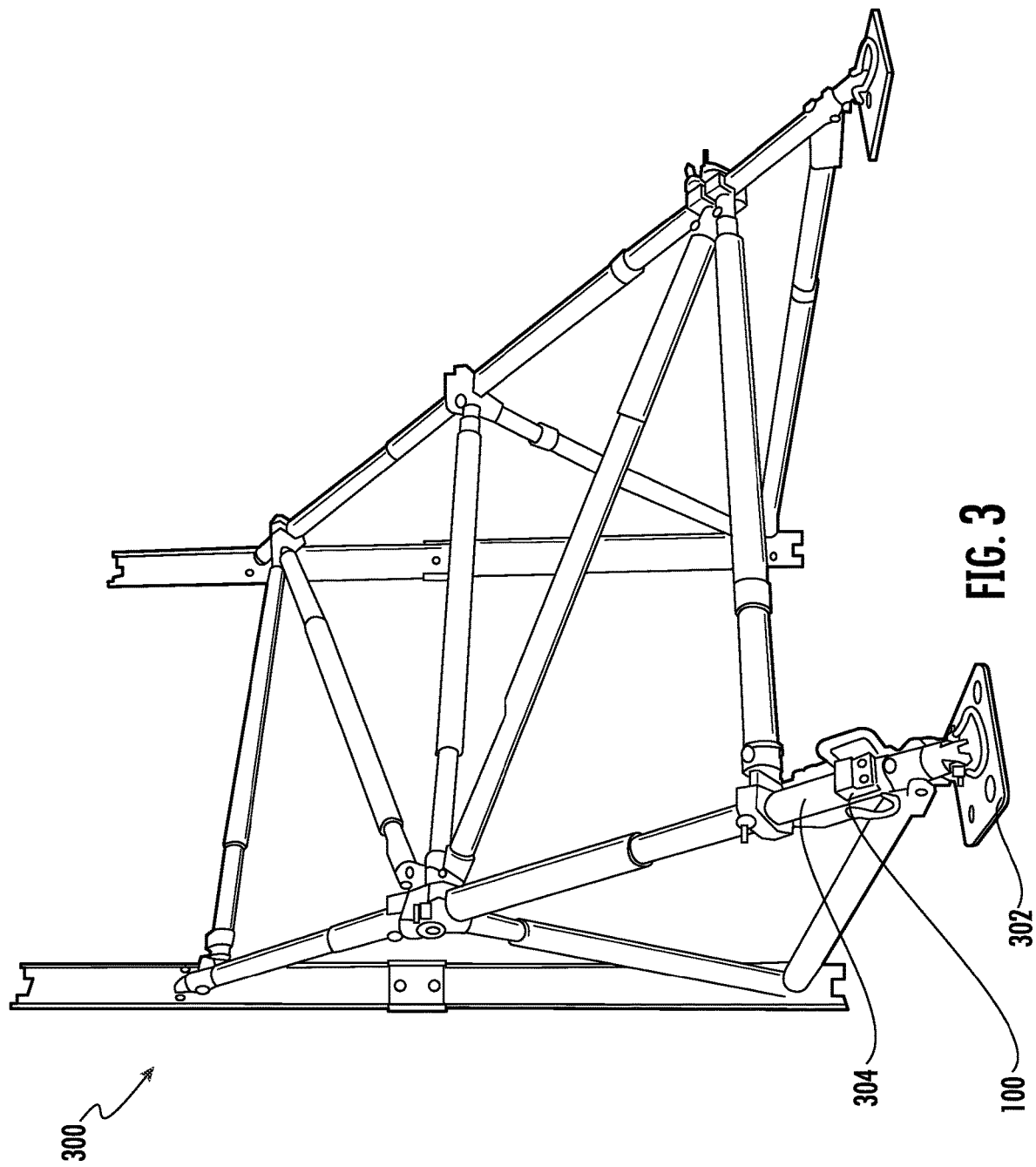
FIG. 3 depicts the in-line electronic strut monitor of FIG. 1 installed in another example of a temporary structural support configuration, according to one or more aspects described herein.

FIG. 3 depicts the in-line electronic strut monitor 100 installed in another example of a temporary structural support configuration 300, according to one or more aspects described herein. As depicted, the monitor 100 is configured to be positioned between a support strut 304 and base plate 302. The configuration 300 includes multiple different strut elements beyond that strut 304, which may be configured to provide a shoring of a vertical structure. The monitor 100 may be configured to detect a compressive force to which the strut 304 is subjected. A user may extrapolate this detected force information to determine stresses at different points within the configuration 300. Additionally or alternatively, a user may monitor a compressive force along the strut 304 in isolation and/or may utilize the monitor 100 to detect a change in force experienced by the strut 304. This change in force may be indicative of a shift in a load that is being supported by the temporary structural support configuration 300, and may be indicative of a potential collapse of the supported structure. Additionally, the monitor 100 may be configured to monitor an angle of inclination of the strut 304 and/or vibration experienced by the strut 304/the support configuration 300 as a whole. Both the angle and vibration measurements may be utilized to provide a warning of a change in structure being supported by the configuration 300.

Figure 4:
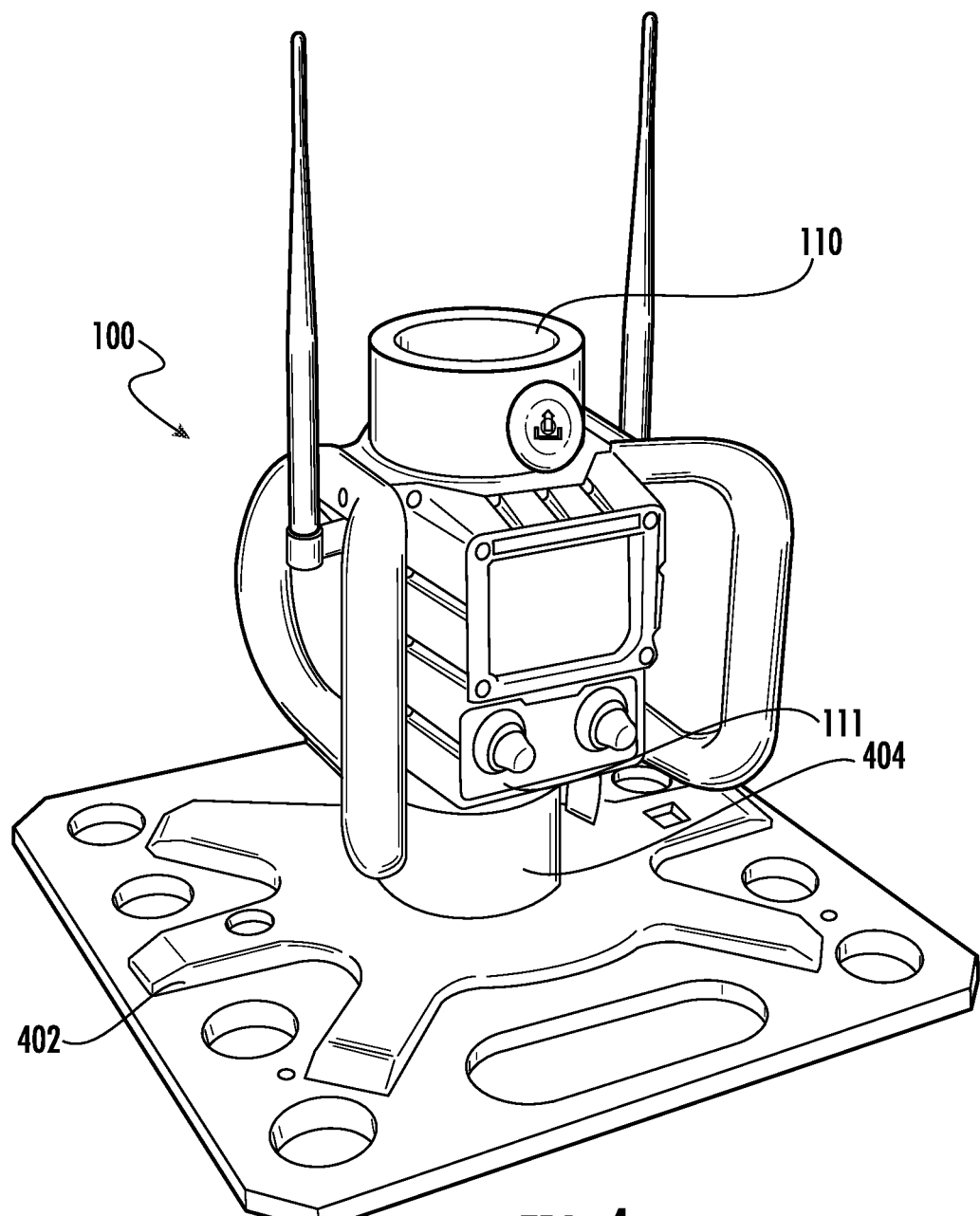
FIG. 4 depicts the in-line electronic strut monitor of FIG. 1 removably coupled to a base plate, according to one or more aspects described herein.
Figure 5:
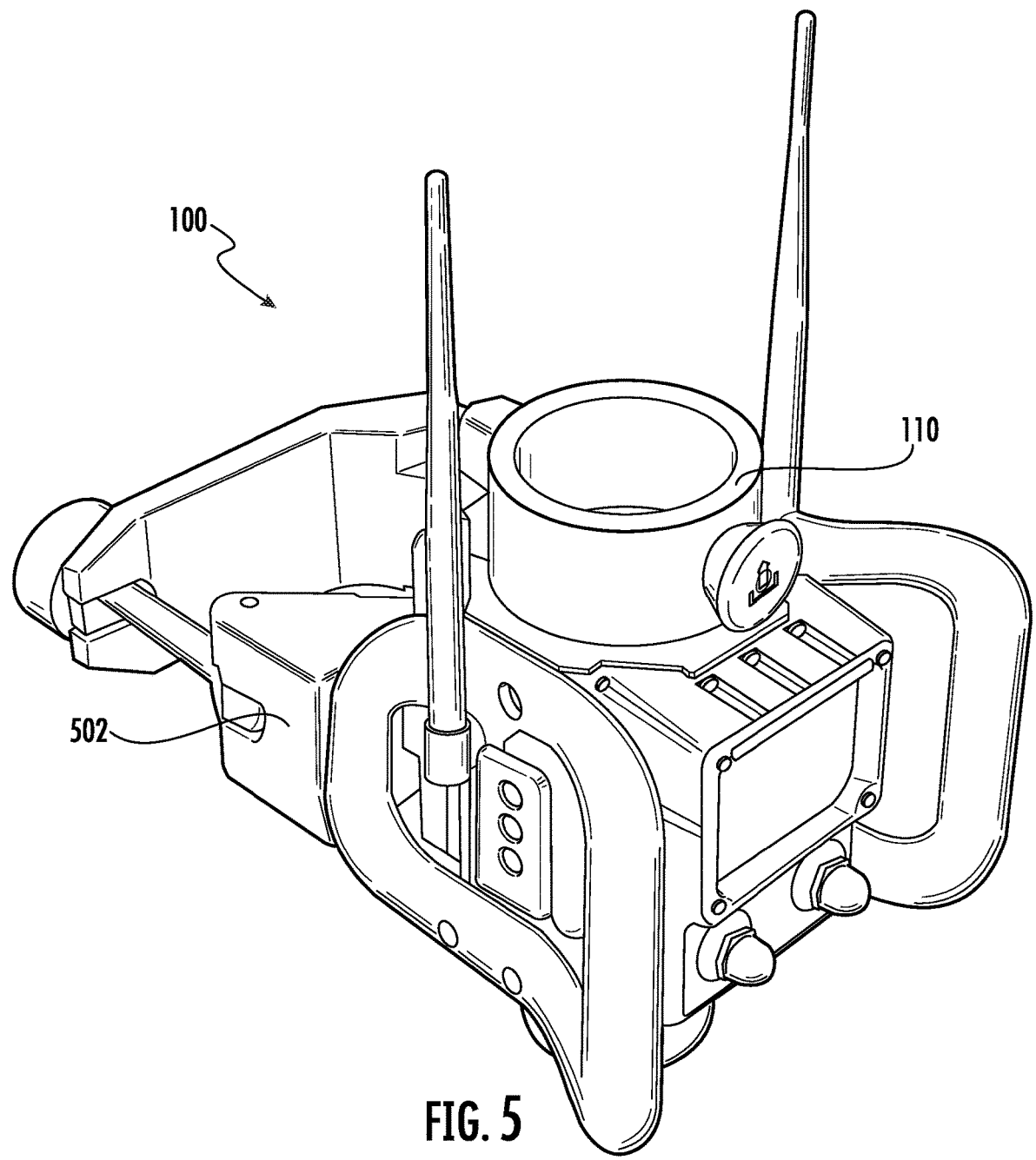
FIG. 5 depicts the in-line electronic strut monitor of FIG. 1 removably coupled to a clamp structure, according to one or more aspects described herein.
Figure 6:
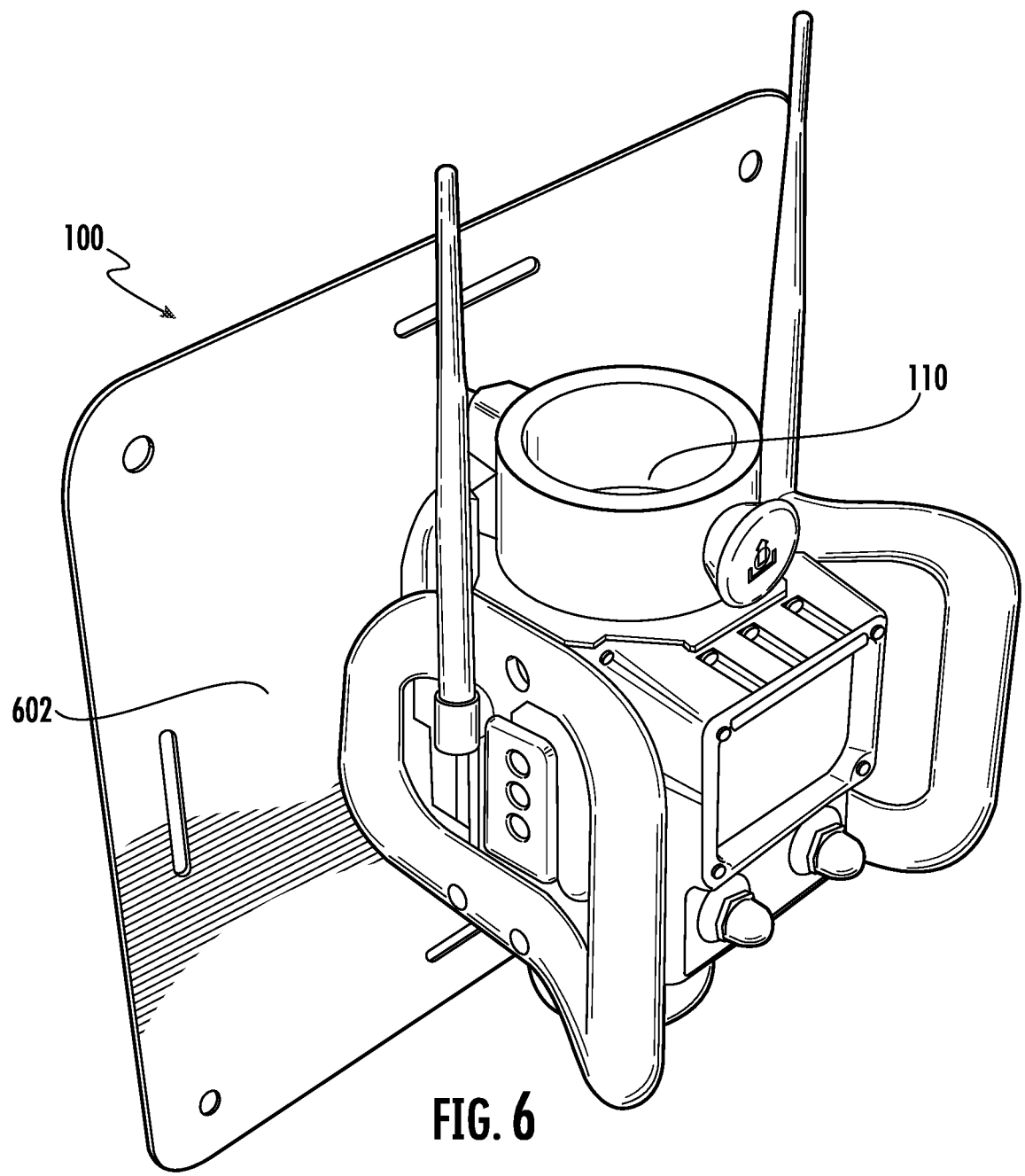
FIG. 6 depicts the in-line electronic strut monitor of FIG. 1 removably coupled to a side plate structure, according to one or more aspects described herein.
Figure 7:
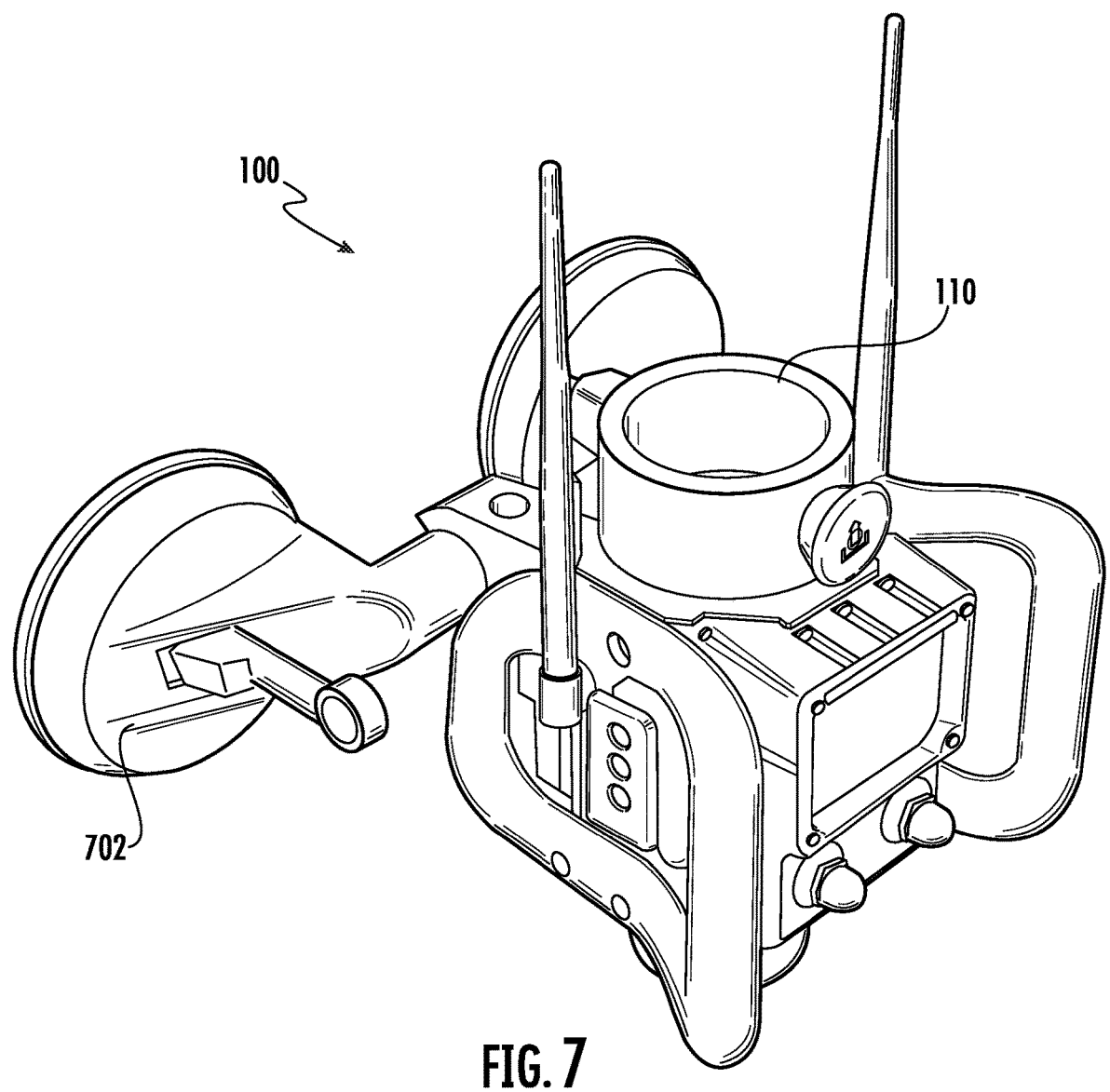
FIG. 7 depicts the in-line electronic strut monitor of FIG. 1 removably coupled to a suction clamp structure, according to one or more aspects described herein.

It is contemplated that the in-line electronic strut monitor 100 may be configured to be removably coupled to a variety of structural members intended to form configurations to provide temporary structural support to one or more unstable structures. These formed configurations may utilize multiple different adjustable strut elements, with one of these strut elements being received into the monitor 100. Additionally, the in-line electronic strut monitor 100 may be coupled to an external structure using the third coupling mechanism 170, and/or may not be coupled to a strut. FIG. 4 depicts the monitor 100 removably coupled to a base plate 402. This baseplate 402 may be configured to position the monitor 100 against a surface that is normal to an axial length of a strut that is received into the first coupling mechanism 110. The baseplate 402 may include a coupling mechanism 404 that is similar to the first coupling mechanism 110, and configured to receive the second coupling mechanism 111 of the monitor 100. FIG. 5 depicts the monitor 100 removably coupled to a clamp structure 502. Specifically, the clamp structure 502 may be removably coupled to the third coupling mechanism of the monitor 100. FIG. 6 depicts the monitor 100 removably coupled to a side plate structure 602. Specifically, the side plate structure 602 may be removably coupled to the third coupling mechanism of the monitor 100. FIG. 7 depicts the monitor 100 removably coupled to a suction clamp structure 702. Specifically, the suction clamp structure 702 may be removably coupled to the third coupling mechanism of the monitor 100.

Figure 8:
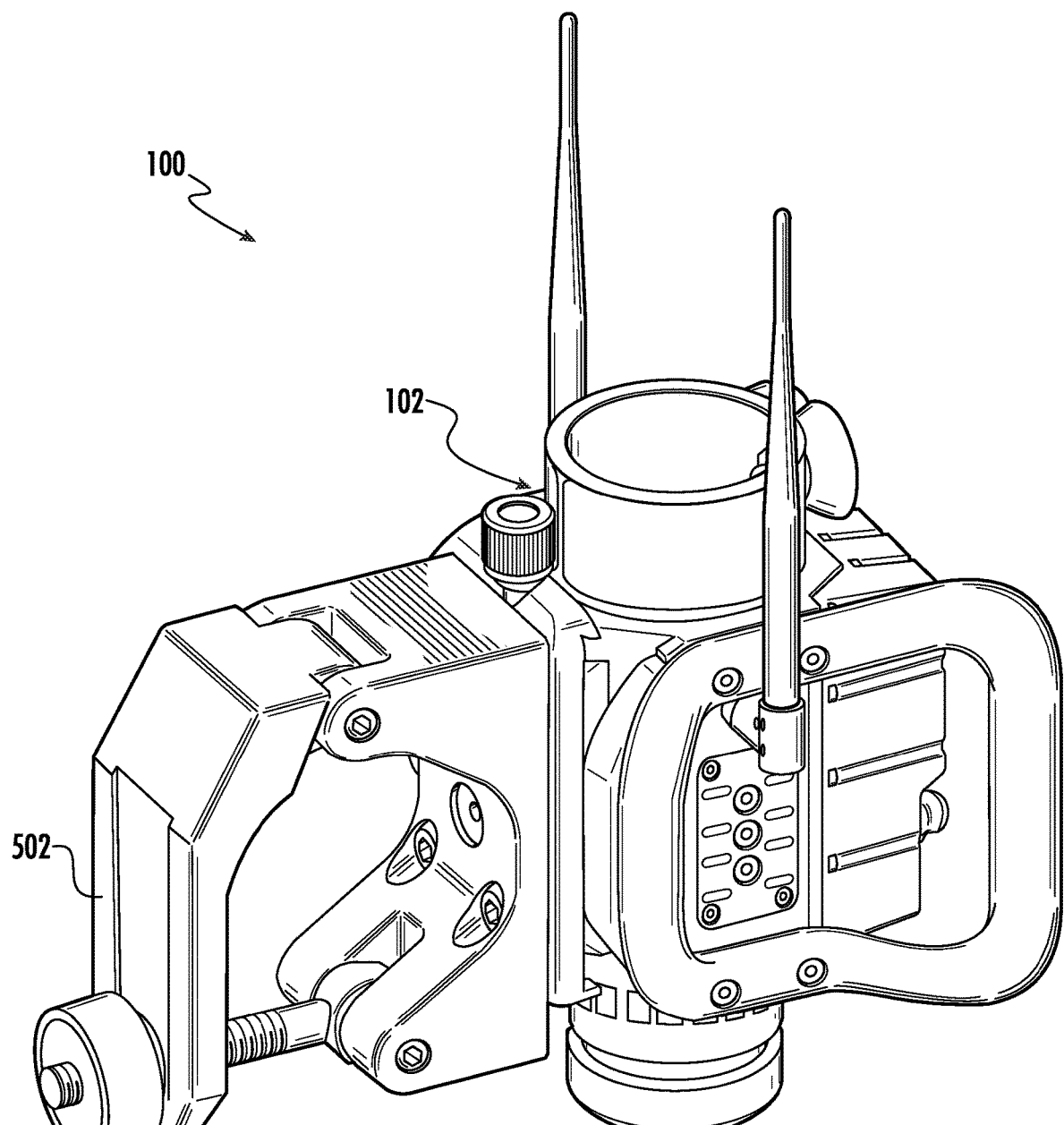
FIG. 8 depicts another isometric view of the in-line electronic strut monitor, according to one or more aspects described herein.

FIG. 8 depicts another isometric view of the in-line electronic strut monitor 100, according to one or more aspects described herein. Specifically, FIG. 8 depicts a backside view of the monitor 100. FIG. 8 depicts the monitor 100 coupled to the clamp structure 502 of FIG. 5. The clamp structure 502 is removably coupled to the monitor 100 in an alternative orientation in FIG. 8.

Figure 9:
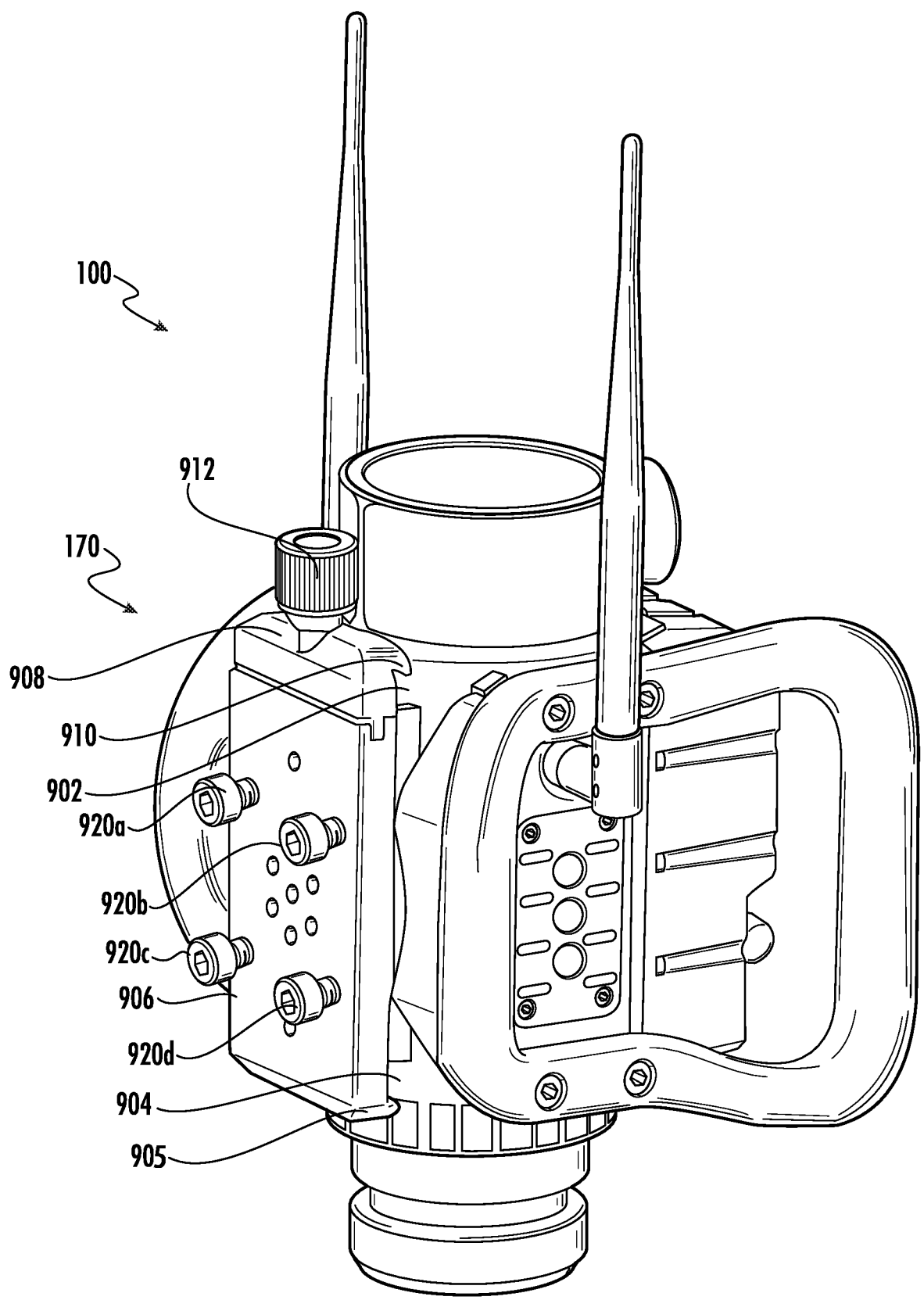
FIG. 9 depicts an isometric view of the in-line electronic strut monitor, according to one or more aspects described herein.

FIG. 9 depicts an isometric view of the in-line electronic strut monitor 100, according to one or more aspects described herein. Specifically, FIG. 9 depicts a more detailed view of the third coupling mechanism 170. In one example, the third coupling mechanism 170 includes an upper rail 902 and a lower rail 904. An attachment plate 906 may be removably coupled to the housing 102 of the monitor 100. In one example, the attachment plate 906 may include an attachment rail 905 with corresponding geometry to the lower rail 904, and configured to catch on the lower rail 904 when the attachment plate 906 is removably coupled to and urged toward an upper attachment bracket 908. The upper attachment bracket includes an attachment rail 910 with corresponding geometry to the upper rail 902. In one example, the upper attachment bracket 908 is removably coupled to the attachment plate 906 by actuating the thumb screw coupling mechanism 912 (which may actuate one or more of a spring-loaded catch or a screw, among others). Removably coupling the upper attachment bracket to the attachment plate 906 clamps the attachment plate 906 and upper attachment bracket 908 between the upper rail 902 and lower rail 904. In another example, the attachment plate 906 may be coupled to the housing 902 by one or more bolts.

In one example, the attachment plate 906 includes one or more, or an array of threaded holes configured to receive bolts of one or more sizes. Those of ordinary skill in the art will recognize that any size bolts may be utilized, without departing from the scope of these disclosures. Depicted in FIG. 9 are four bolts 920a-d. These bolts 920a-d are used to couple, for example, the clamp 502 to the housing 102 in FIG. 8.

Figure 10:
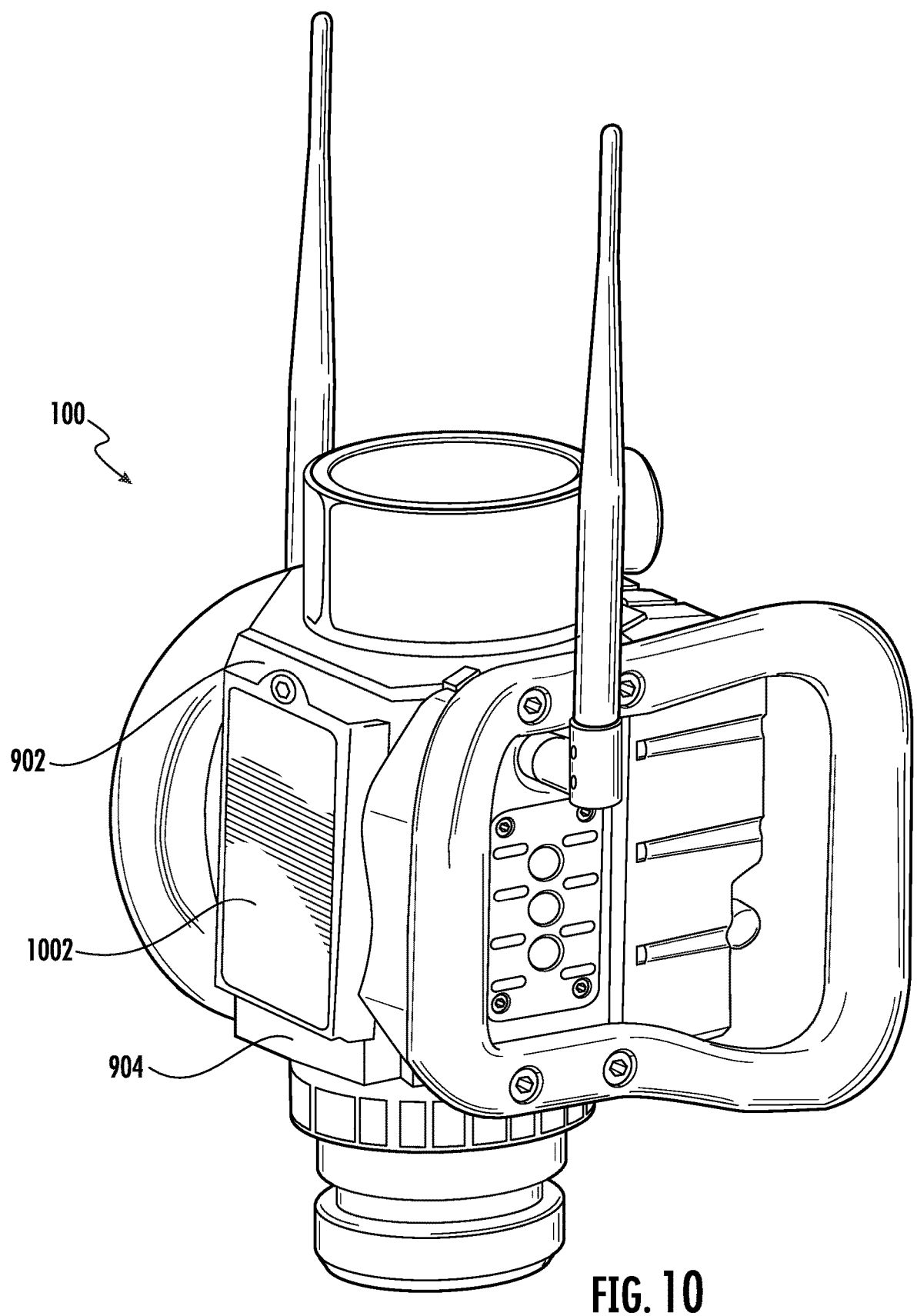
FIG. 10 depicts an isometric view of the in-line electronic strut monitor, according to one or more aspects described herein.

FIG. 10 depicts an isometric view of the in-line electronic strut monitor 100, according to one or more aspects described herein. The isometric view of FIG. 10 depicts the monitor 100 without the attachment plate 906 and upper attachment bracket 908. As depicted, the housing 102 includes a battery cover 1002 that is configured to provide access to a user-replaceable battery.

Figure 11:
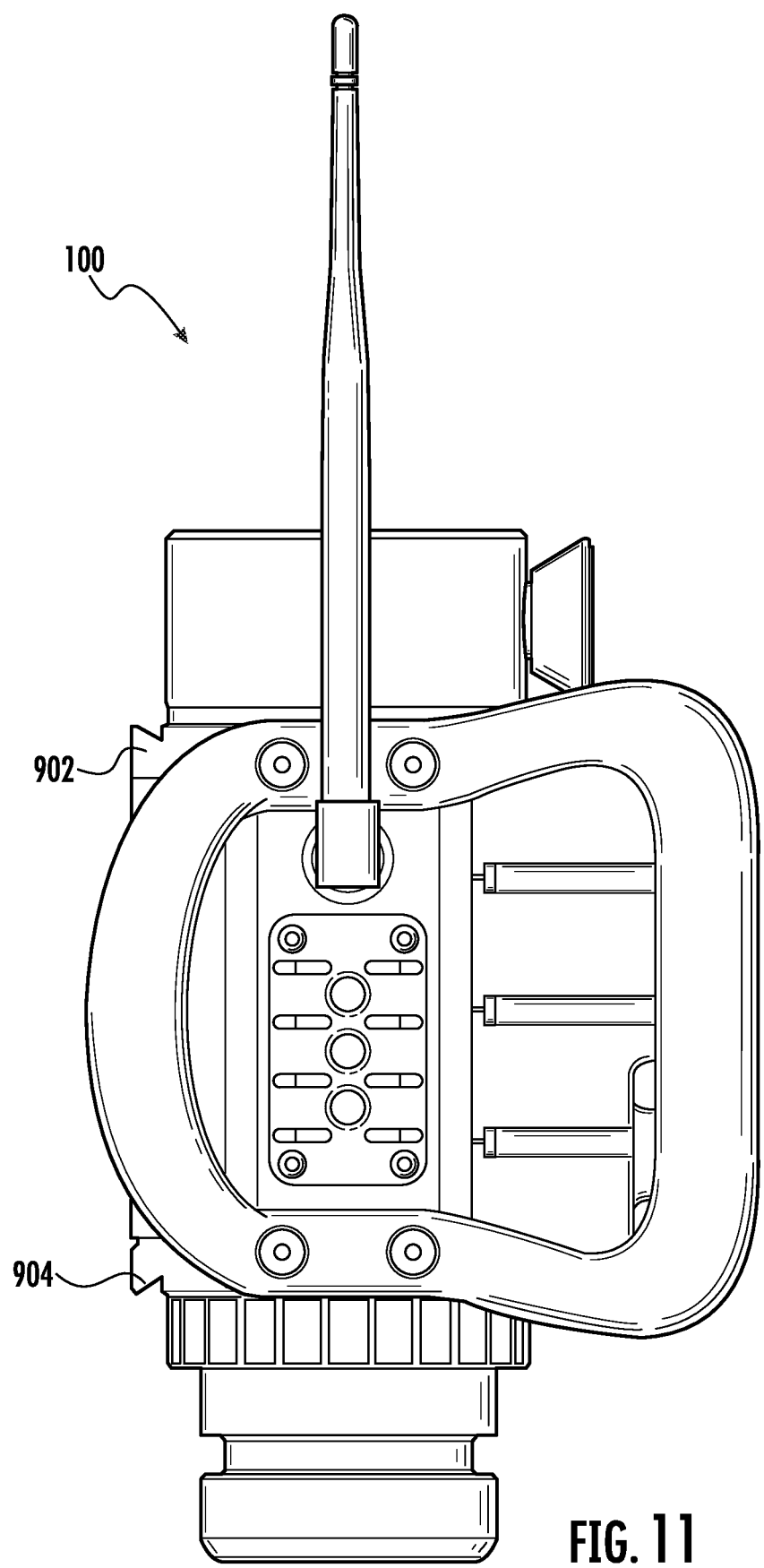
FIG. 11 depicts a side view of the in-line electronic strut monitor, according to one or more aspects described herein.
Figure 12:
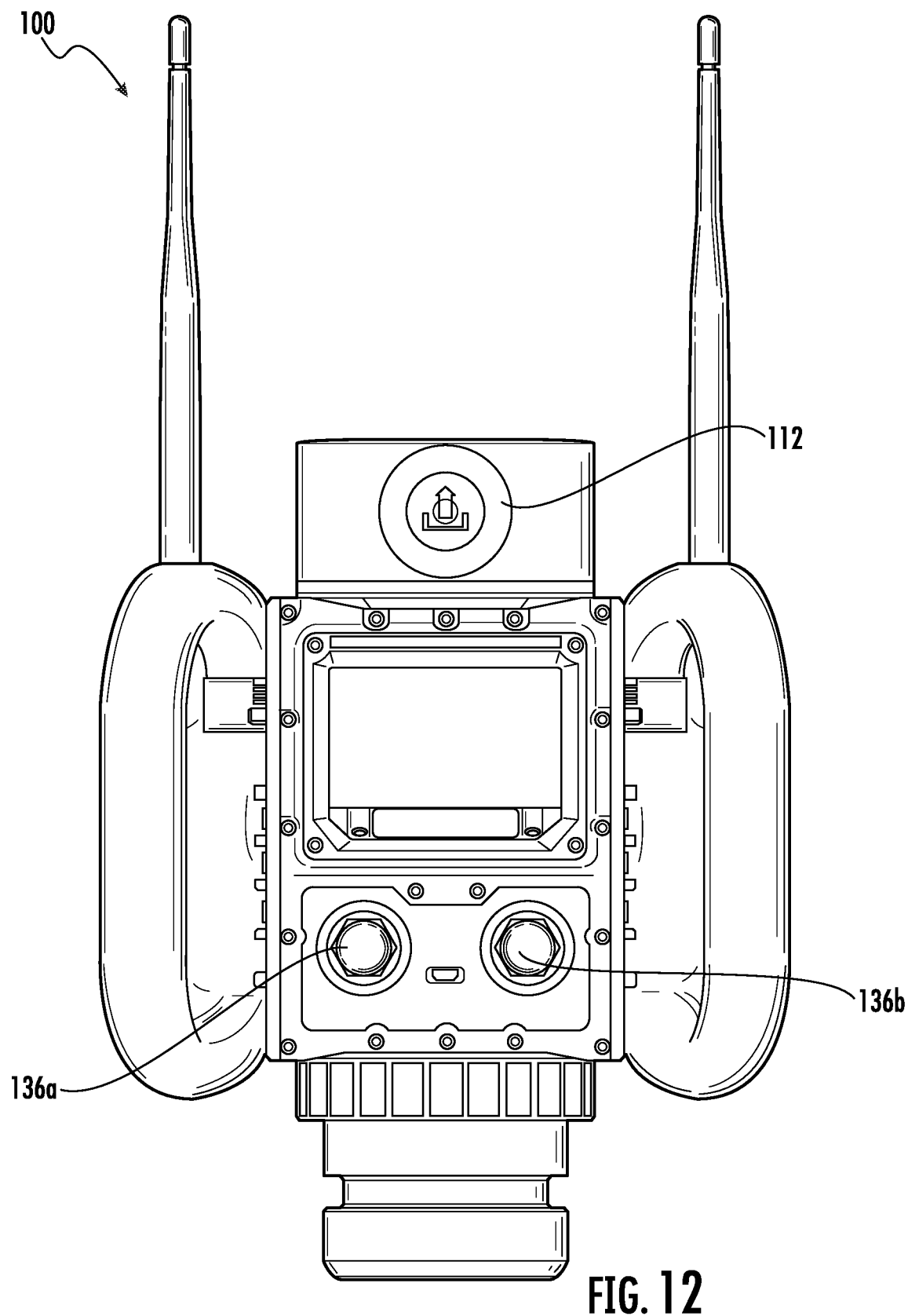
FIG. 12 depicts a front view of the in-line electronic strut monitor, according to one or more aspects described herein.
Figure 13:
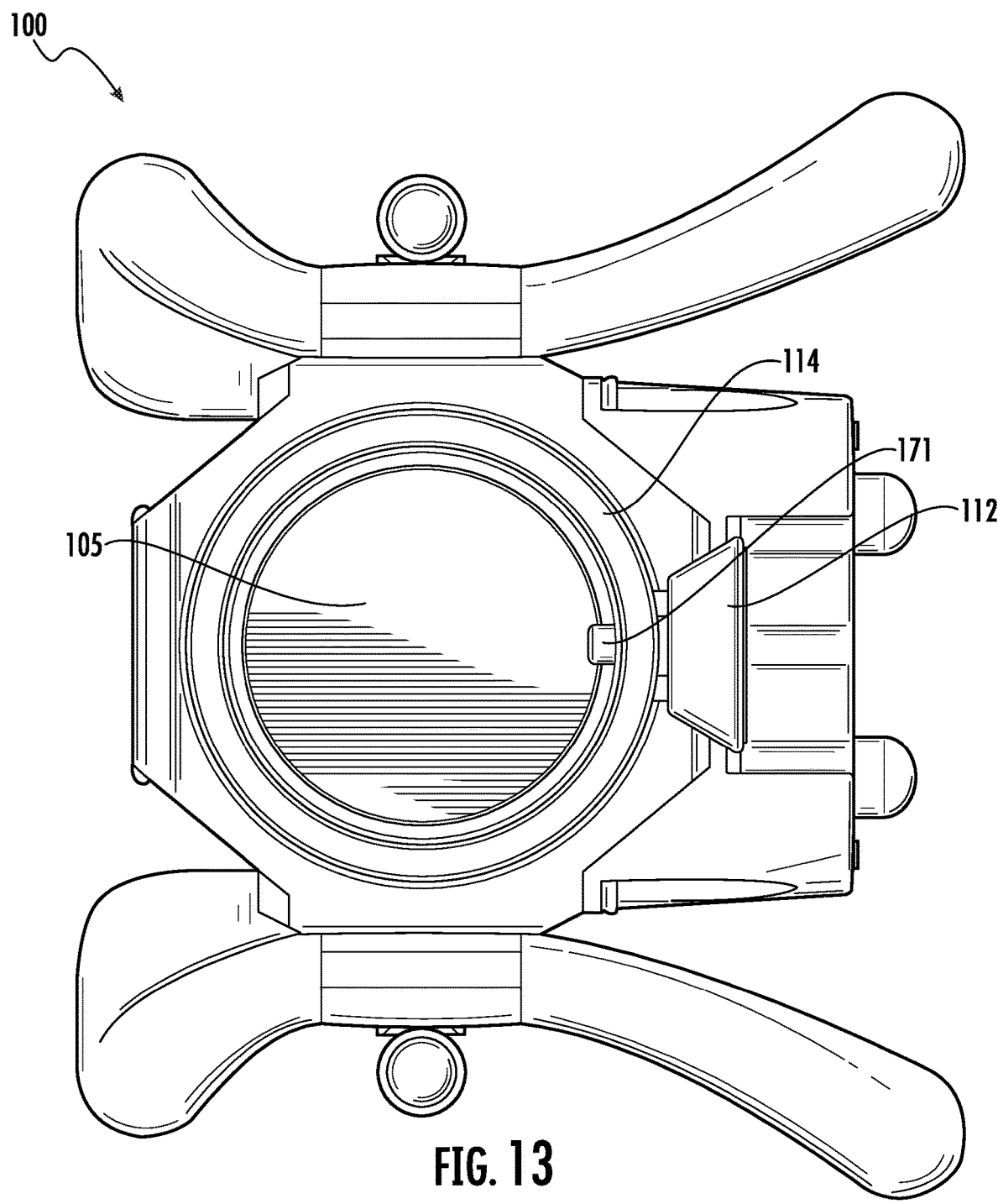
FIG. 13 depicts a top view of the in-line electronic strut monitor, according to one or more aspects described herein.

FIG. 11 depicts a side view of the in-line electronic strut monitor 100, according to one or more aspects described herein. FIG. 12 depicts a front view of the in-line electronic strut monitor 100, according to one or more aspects described herein. The input controls 136a and 136b may be used to setup the monitor 100 for monitoring one or more of load, vibration and inclination/tilt angle. In one example, when installed in a support structure and loaded, the monitor 100 may be initiated by actuating one or more of the input controls 136a-136b. This initiation may record setpoint values of load, tilt angle and vibration frequency/energy. The monitor 100 may actuate one or more alarm elements (e.g., one or more of an audible or visible alarm, and/or an electronic signal communicated to an external device, such as a phone, tablet, computer) when the monitored values of load, tilt angle or vibration frequency/energy change by a certain predetermined amount, such a predetermined percentage amount or predetermined absolute value amount. It is contemplated that this predetermined amount may be any amount. It is also contemplated that the change in monitored value that initiates one or more alarm elements may be an automatically set amount, or may be a manually selected amount, selected using one or more of the input controls 136a-136b. FIG. 13 depicts a top view of the in-line electronic strut monitor 100, according to one or more aspects described herein.

FIG. 14 schematically depicts a monitoring device 1400, according to one or more aspects described herein. The monitoring device 1400 may be similar to monitoring device 130. Accordingly, the monitoring device 1400 may include application-specific integrated circuits and/or general purpose circuitry configured to monitor one or more parameters of a strut to which the monitoring device 1400 is coupled. In one example, the monitoring device 1400 may be configured to monitor load (force), vibration (vibration intensity, frequency among others), and tilt angle.

The monitoring device 1400 may include a processor 1402 that is configured to control the overall operation of the device 1400. The processor 1400 may execute instructions received from memory 1404. Accordingly, memory 1404 may be a form of volatile or persistent memory of any type, and may be RAM, ROM, among others. The transceiver 1406 may be configured with requisite hardware, firmware and software to facilitate wired and/or wireless communication between the monitoring device 1400 and one or more external devices, such as smartphones, wireless internet routers. The transceiver 1406 may be configured to send and/or receive information to/from an application running on a connected device, such a wirelessly connected smartphone or tablet. This application may be used to monitor data generated by the monitoring device 1400 from a remote location, and/or to send setting information to the monitoring device 1400.

In one example, the transceiver 1406 may be configured to receive information from hardware to which the monitoring device 1400 is configured to be removably coupled. Specifically, the transceiver 1406 may receive information from a strut (e.g., strut 304) or another type of support hardware (e.g., base 302). This received information may identify the connected hardware elements, and this information may be used to determine a maximum load to which the coupled hardware may be subjected. It is contemplated that the transceiver 1406 may be configured to communicate across any wired or wireless communication channel utilizing any communication protocol. Examples include, but are not limited to Wi-Fi, Bluetooth, Ethernet, a cellular network, infrared, RFID, among others.

Additionally or alternatively, the transceiver 1406 may be configured with a location determining sensor, such as a global positioning system (GPS) receiver, or another location determining receiver or transceiver.

The monitoring device 1400 may include a load cell transducer 1408 configured to output a signal proportional to a load, or a force, to which the transducer is subjected. Accordingly, the load cell transducer 1408 may be positioned such that the force of a connected strut is transmitted partially or wholly through to the transducer 1408. It is contemplated that any transducer technology may be utilized, without departing from the scope of these disclosures.

The monitoring device 1400 may additionally include interface 1410. This interface 1410 may be configured with user interface hardware, firmware, and/or software configured to facilitate manual interface with the monitoring device 1400 of the strut monitor, such as strut monitor 100. Accordingly, the interface 1410 may be in operative communication with a display and/or control buttons 1414, which may be similar to elements 134 and 136.

The monitoring device 1400 may additionally include an inertial unit 1412. This inertial unit 1412 may include an accelerometer, and/or a gyroscope. Further, the accelerometer and/or the gyroscope may be sensitive along one, two, or three mutually perpendicular axes. The monitoring device 1400 may additionally include a database 1414 that may be configured to store data at recorded by the monitoring device 1400 for subsequent review and/or analysis. The database 1414 may store information related to a type of hardware to which the monitoring device 1400 is coupled, loads exerted on the monitor (e.g., monitor 100) within which the monitoring device 1400 is encapsulated, loading events corresponding to changes in load exerted on the monitor within which the monitoring device 1400 is encapsulated, vibration data, tilt angle data, among others. It is contemplated that any database structure and/or protocol may be used to store the information within database 1414, without departing from the scope of these disclosures.

In one example, the monitoring device 1400 may include recorder functionality, which may be referred to as black box functionality. This black box functionality may allow a user to analyze data following the use of the monitoring device 1400 in a rescue scenario during which it is used to monitor a load, vibration, and/or tilt angle of a strut used to shore an otherwise unstable external structure. The black box functionality may automatically communicate data stored in database 1414 to an external device to which the monitoring device 1400 is wired or wirelessly connected upon detection of a trigger event, such as a change in load, tilt angle, and/or vibration intensity above a threshold amount. In another example, the monitoring device 1400 may continuously store data locally within database 1414 and simultaneously store that same data, or a portion thereof, in a remote location away from the monitoring device 1400. In one example, the monitoring device 1400 may store load, vibration, and/or tilt angle information for a strut to which the monitoring device 1400 is connected, as well as from separate monitoring devices to which the device 1400 may be in wired or wireless communication. In this scenario, The monitoring device 1400 may act as a redundant database storing information from separate monitoring devices used to support various structures at the site of a rescue or other type of shoring operation. In another example, the black box functionality of the monitoring device 1400 may transmit stored information from database 1414 to a user upon receipt of a request by that user. The information may be transmitted to the display 1414, and/or to the transceiver 1406 for communication to an external device.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

FIG. 15 is a flowchart diagram 1500 that may be executed by the monitoring device 1400, according to one or more aspects described herein. In one example, one or more processes may be executed at block 1502 of flowchart 1500 to identify a length and/or a type of a strut (e.g., strut 300) (or other support hardware, such as base plate 302) that is removably coupled to the monitoring device 1400. In one example, this identification may be automatic, based upon a signal received from the attached hardware. Further this signal may be received from a Bluetooth low energy (BTLE) transceiver within the attached hardware, or from an RFID tag, among others. Further, the received information may include a length of the strut, which may be a fixed length of a length at which the strut has been adjusted. Those of ordinary skill in the art will recognize that the loading to which a strut may be subjected will depend upon the strut geometry, which may include the material type, material thickness, one or more strut widths, and/or a length of the strut. In additional or alternative examples, the strut length and type may be identified block 1502 based upon manually entered information received by the monitoring device 1400.

One or more processes may be executed at block 1504 to identify maximum conditions to which the strut may be subjected, based upon the identified strut type and length from block 1502. These maximum conditions may include a maximum load, a maximum vibration frequency/energy, and/or a maximum tilt angle, among others.

One or more processes may be executed at block 1506 to set a threshold above which the monitor will execute an alert. This threshold may be a load threshold, a vibration threshold, or a tilt angle threshold, among others. The threshold set at block 1506 may be automatically determined based upon a lookup table stored within the database 1414, and/or may be manually entered into the monitoring device 1400.

Decision block 1508 may correspond to one or more monitoring processes during which the monitoring device 1400 periodically calculates one or more of a load, vibration intensity and/or frequency, and/or tilt angle, and compares the calculated data to the threshold set at block 1506. If the threshold has not been reached, flowchart 1500 proceeds to block 1510 and the strut monitor 1400 continues monitoring the structural support system that includes one or more struts. If one or more thresholds are reached, flowchart 1500 proceeds to block 1512, at which one or more alarms may be activated. These one or more alarms may be local to the device 1400 (e.g., on the monitor 100), and/or may be remote. A local alarm may include an audible and/or visible alert signal. In one example, a remote alarm may include a signal to activate a warning on a device to which the strut monitor 1400 is connected.

Figure 16:
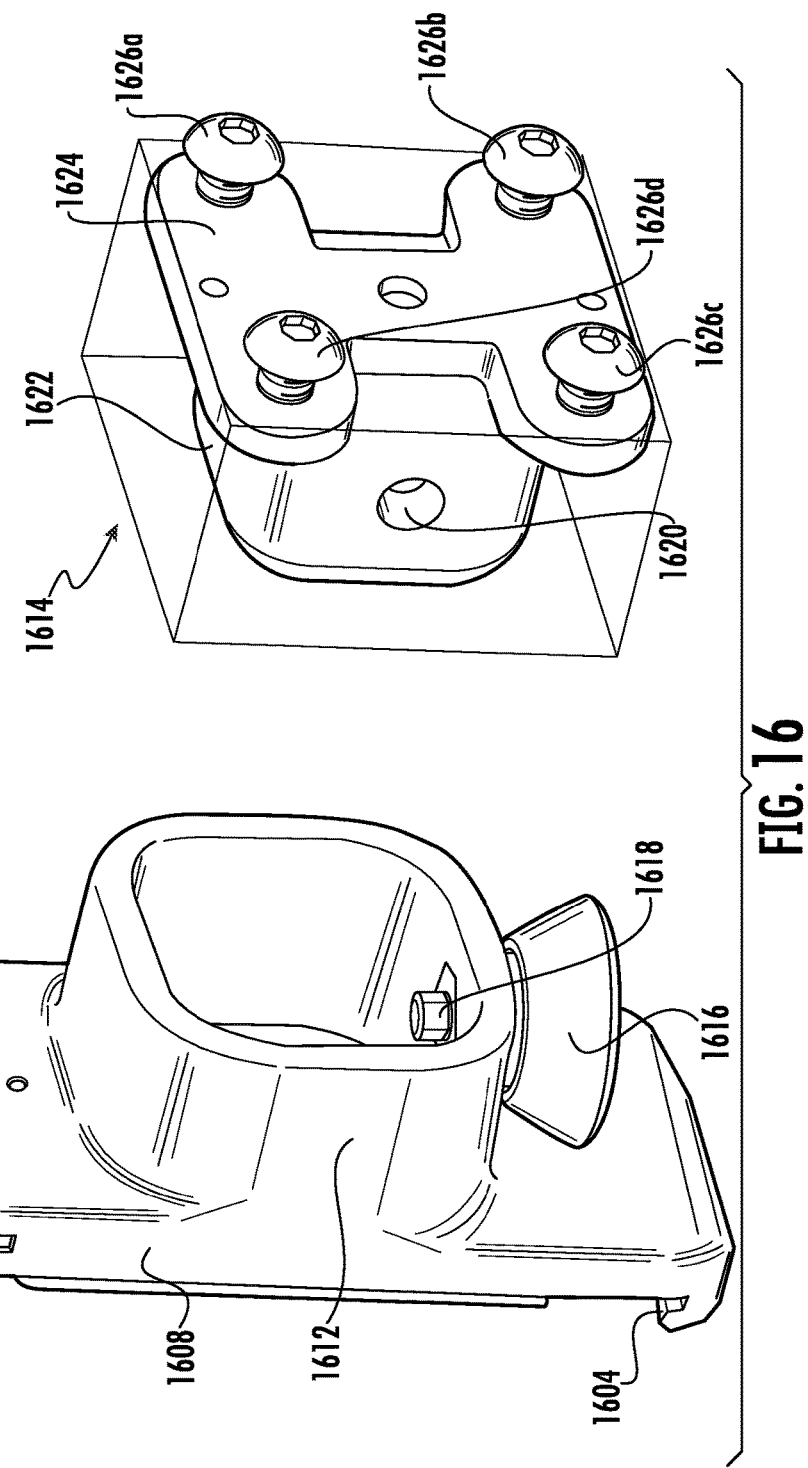
FIG. 16 depicts an isometric view of an alternative coupling mechanism, according to one or more aspects described herein.

FIG. 16 depicts an isometric view of an alternative coupling mechanism 1600, according to one or more aspects described herein. The coupling mechanism 1600 may be similar to coupling mechanism 170. As such, the coupling mechanism 1600 may be configured to be removably coupled to the monitor 100 in a manner similar to the mechanism 170. In one exam, the coupling mechanisms 170 and 1600 may be referred to as "backpack" elements.

Advantageously, the coupling mechanism 1600 may be utilized to facilitate rapid coupling and uncoupling of structures to the monitor 100. These structures may include clamp structure 502, plate structure 602, and suction clamp structure 702 among others. The coupling mechanism 1600 may include attachment rails 1602 and 1604, which may be configured to be removably coupled to the upper rail 902 and lower rail 904 of the monitor 100, as previously described. Similar to coupling mechanism 170, the coupling mechanism 1600 may include an upper attachment bracket 1606 (similar to upper attachment bracket 908) that is removably coupled to an attachment plate 1608 (similar to attachment plate 906) by a thumb screw coupling mechanism 1610 (similar to coupling mechanism 912). The coupling mechanism 1600 additionally includes a socket sleeve 1612 into which a quick-attach bracket 1614 is removably coupled by a pull button (otherwise referred to as a pull pin) 1616. The pull button 1616 which includes a spring-actuated catch 1618 that is received into a corresponding hole or depression of the quick-attach bracket 1614. One of these holes of the quick-attach bracket 1614 is depicted in FIG. 16 as element 1620. In one example, the quick-attach bracket 1614 has a rounded square plug sleeve geometry 1622 configured to be received into the rounded square geometry of the socket sleeve 1612. Further, the plug sleeve 1622 may have 4 substantially symmetrical sides with holes similar to hold 1620 such that the catch 1618 can engage with the plug sleeve 1622 regardless of the orientation of the plug sleeve 1622 relative to the socket sleeve 1612. The quick-attach bracket 1614 may additionally include an attachment surface 1624 to which external structures may be bolted. These external structures may include, among others, structures 502, 602, and/or 702. Accordingly, the attachment surface 1624 of the quick-attach bracket 1614 may include tapped or untapped attachment holes configured to receive bolts 1626a-d. It is contemplated, similar to the other structures throughout this disclosure, that the bolts 1626a-d may be of any size and the tapped/untapped holes into which they are received may be spaced with any spacing pattern relative to one another.

Figure 17:
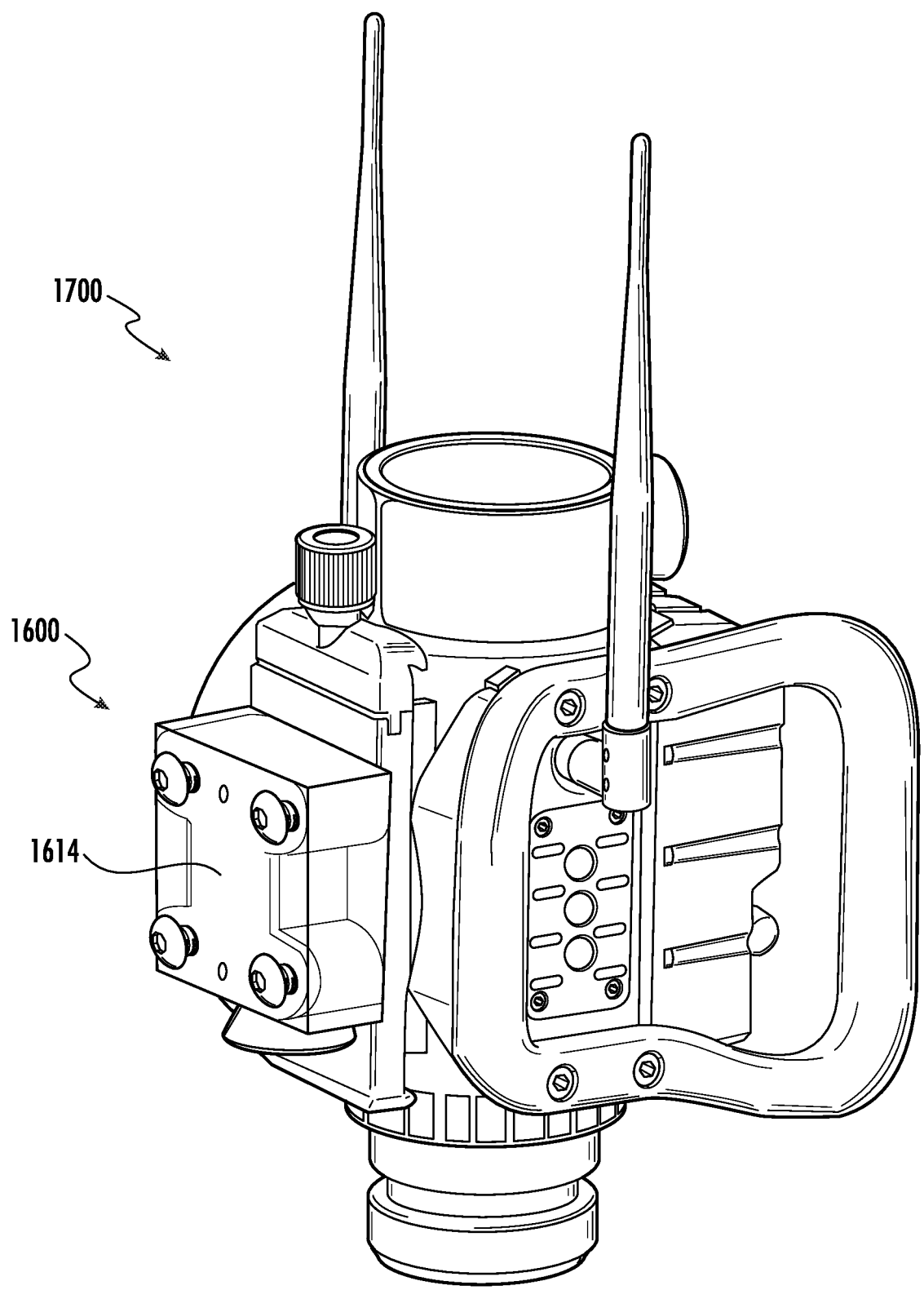
FIG. 17 depicts an isometric view of an electronic strut monitor, according to one or more aspects described herein.

FIG. 17 depicts an isometric view of an electronic strut monitor 1700, according to one or more aspects described herein. The electronic strut monitor 1700 may be similar to electronic strut monitor 100, as previously described. As depicted, the electronic strut monitor 1700 is removably coupled to the backpack coupling mechanism 1600, as described in relation to FIG. 16. Further, the backpack coupling mechanism 1600 is removably coupled to the quick-attach bracket 1614, which may in turn be coupled (bolted) to external clamp elements (not depicted in FIG. 17).

Figure 18:
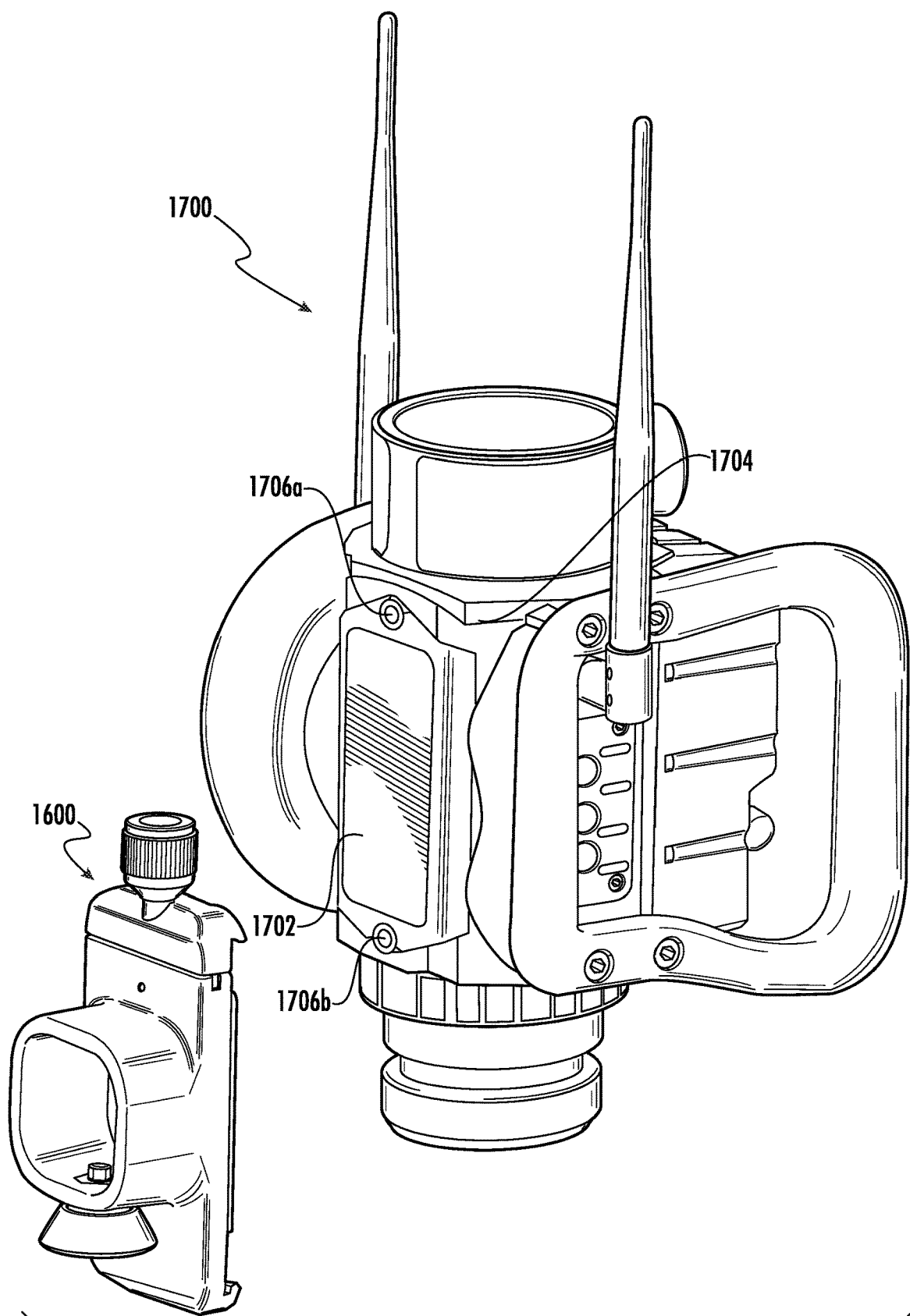
FIG. 18 depicts an isometric view of the electronic strut monitor of FIG. 17 decoupled from the backpack coupling mechanism, according to one or more aspects described herein.

FIG. 18 depicts an isometric view of the electronic strut monitor 1700 decoupled from the backpack coupling mechanism 1600, according to one or more aspects described herein. As depicted in FIG. 18, the backpack coupling mechanism 1600 has been decoupled from quick-attach bracket 1614. When the backpack coupling mechanism 1600 has been decoupled from the electronic strut monitor 1700, which exposes the battery cover 1702. This battery cover 1702 provides access to one or more batteries powering the electronics of the monitor 1700. The battery cover 1702 may be similar to battery cover 1002, but the battery cover 1702 is affixed to the casing 1704 of the monitor 1700 by two fasteners 1706a, 1706b (which may be two bolts, although the those of ordinary skill in the art will recognize that any fixture type may be used in place of the depicted fixtures throughout this disclosure).

Aspects of this innovation relate to an in-line electronic strut monitor for a temporary support strut. The in-line electronic strut monitor includes a housing that has a first end with a first bore extending into the housing and a second end spaced apart from the first end along an axial length. The electronic strut monitor additionally includes a first coupling mechanism at the first end that is configured to removably couple the first end of the housing two a first end of a temporary support strut. The electronic strut monitor may additionally include a second coupling mechanism at the second end of the housing, with the second coupling mechanism having a cylindrical shaft with a circumferential channel configured to be received into a corresponding bore of an external attachment structure. The electronic strut monitor may additionally include a third coupling mechanism that is positioned on a side wall that extends along a portion of the housing between the first end and the second end. The electronic strut monitor may also include a monitoring device that is positioned within the housing, with the monitoring device having a load cell configured to measure at least a portion of a force exerted upon the first coupling mechanism by the removably coupled temporary support strut. The electronic strut monitor may also have an electronic interface that is configured to communicate information about the force measured by the load cell to a user.

The sidewall of the in-line electronic strut monitor may be a first sidewall, and the housing may additionally include a second sidewall and ⅓ sidewall, with the in-line electronic monitor having a first handle structure rigidly coupled to the second sidewall, and a second handle structure rigidly coupled to the third sidewall.

The electronic interface of the in-line electronic strut monitor may include an electronic display attached to fourth sidewall of the housing.

The first and second handle structures of the in-line electronic strut monitor may each include a closed-loop structure intended to prevent the electronic display from being accidentally impacted by an external surface.

The electronic interface may include a wireless transceiver configured to transmit sensor information (including force, tilt angle, vibration force and/or frequency) to a remote device of a user.

The in-line electronic strut monitor may be configured to monitor a compressive force or a tensile force.

The monitoring device of the in-line electronic strut monitor may also include an inclination/tilt sensor that is configured to detect a tilt angle of an axial length of the housing of the monitor.

The in-line electronic strut monitor may additionally include a vibration sensor within the monitoring device.

The monitoring device of the in-line electronic strut monitor may additionally include an alarm configured with audible and visible alert indicators.

In one example, the first coupling mechanism may include a spring-loaded catch that is configured to extend from a sidewall of the housing into the bore, and configured to be received into the channel of the first end of a temporary support strut.

The third coupling mechanism may be similar to the first coupling mechanism, and may include a spring-loaded catch.

In another example, the third coupling mechanism may be similar to the second coupling mechanism.

In another aspect, this innovation relates to an in-line electronic strut monitor for a temporary support strut. The in-line electronic strut monitor includes a housing that has a first end with a first bore extending into the housing and a second end spaced apart from the first end along an axial length. The electronic strut monitor additionally includes a first coupling mechanism at the first end that is configured to removably couple the first end of the housing two a first end of a temporary support strut. The electronic strut monitor may additionally include a second coupling mechanism at the second end of the housing, with the second coupling mechanism having a cylindrical shaft with a circumferential channel configured to be received into a corresponding bore of an external attachment structure. The electronic strut monitor may also include a monitoring device that is positioned within the housing, with the monitoring device having a load cell configured to measure at least a portion of a force exerted upon the first coupling mechanism by the removably coupled temporary support strut. The electronic strut monitor may also have an electronic interface that is configured to communicate information about the force measured by the load cell to a user.

In another aspect, an in-line electronic strut monitor for a support strut may include a housing configured to be removably coupled to a support strut, a monitoring device positioned within the housing, the monitoring device having a processor, a non-transitory computer-readable medium that has computer-executable instructions that, when executed by the processor, are configured to identify a strut type and strut length be used to shore a structure, identify a maximum permissible load for the identified strut type and strut length, set a threshold load equal to the identified maximum permissible load, monitor a current load acting upon the housing as the support strut is being installed to shore the structure, and activate an alarm if the current load exceeds the maximum permissible load.

At least one of the strut type and strut length associated with the in-line electronic strut monitor may be automatically identified by the monitoring device using information received from a beacon coupled to the support strut. This beacon may be an RFID tag, a Bluetooth (such as Bluetooth low energy) beacon, a barcode, a QR code, among others.

In another example, the strut type and strut length may be identified from information entered manually into the in-line electronic strut monitor.

In one example, the alarm may include a signal transmitted from the monitoring device to an external device, and/or may include an audible and/or visible signal emitted from the electronic strut monitor.

In another aspect, an electronic monitor may include a housing that has a first end with a first bore extending into the housing and a second end spaced apart from the first end along an axial length. The electronic monitor may also include a first coupling mechanism at the first end, a second coupling mechanism at the second end of the housing, the second coupling mechanism including a cylindrical shaft with a circumferential channel, and a third coupling mechanism positioned on a sidewall that extends along a portion of the housing between the first end and the second end. The electronic monitor may additionally include a monitoring device positioned within the housing, the monitoring device having a load cell sensor and a vibration sensor, and an electronic interface configured to communicate information from the monitoring device to a user.

The first coupling mechanism of the electronic monitor may be configured to removably couple the first end of the housing two a first end of a temporary support strut.

The monitoring device may be configured to measure at least a portion of a force exerted upon the first coupling mechanism by the removably coupled temporary support strut.

The second coupling mechanism or the third coupling mechanism may be configured to be removably coupled to an external attachment structure.

The sidewall may be a first sidewall, and the housing may additionally include a second sidewall and a third sidewall, with the electronic monitor having a first handle structure rigidly coupled to the second sidewall, and a second handle structure rigidly coupled to the third sidewall, such that the first and second handle structures comprise a closed-loop structure configured to prevent the electronic interface from being accidentally impacted by an external surface.

The electronic interface may include an electronic display attached to a fourth sidewall of the housing.

The electronic interface may include a wireless transceiver configured to transmit sensor information to a remote device of the user.

The monitoring device may also include an inclination sensor configured to detect a tilt angle of the axial length of the housing.

The monitoring device may include an alarm configured with audible and visible alert indicators.

The first coupling mechanism may include a spring-loaded catch configured to extend from a sidewall of the housing into the bore, and configured to be received into a channel of the first end of the temporary support strut.

In another aspect, an electronic monitor may include a housing that has a first end with a first bore extending into the housing, and a second end spaced apart from the first end along an axial length. The electronic monitor may additionally include a first coupling mechanism at the first end configured to removably couple the first end of the housing two a first end of a temporary support strut. The electronic monitor may also include a second coupling mechanism at the second end of the housing, the second coupling mechanism having a cylindrical shaft with a circumferential channel. The electronic monitor may also include a monitoring device positioned within the housing, with the monitoring device having a load cell configured to measure at least a portion of a force exerted upon the first coupling mechanism by the removably coupled temporary support strut, and an electronic interface configured to communicate to a user information about the force measured by the load cell.

The sidewall may be a first sidewall, and the housing may additionally include a second side wall of the third sidewall, with the electronic monitor further including a first handle structure rigidly coupled to the second sidewall, and a second handle structure rigidly coupled to the third sidewall.

The electronic interface may include a wireless transceiver configured to transmit sensor information to a remote device of the user.

The monitoring device may additionally include an inclination sensor configured to detect a tilt angle of the axial length of the housing.

The monitoring device may additionally include a vibration sensor.

An electronic monitor may include a housing configured to be removably coupled to a support strut, a monitoring device positioned within the housing, with the monitoring device having a processor, and a non-transitory computer-readable medium that has computer-executable instructions that, when executed by the processor are configured to: identify a strut type and a strut length to be used to shore a structure, identify a maximum permissible load for the identified strut type and strut length, set a threshold load equal to the identified maximum permissible load, monitor a current load acting upon the housing as the support strut is being installed to shore the structure; and activate an alarm if the current load exceeds the maximum permissible load.

At least one of the strut type and strut length may be automatically identified by the monitoring device using information received from a beacon coupled to the support strut.

The beacon may be an RFID tag.

At least one of the strut type and strut length may be identified from information entered manually into the electronic monitor.

The alarm may include a signal transmitted from the monitoring device to an external device.

Exemplary Clauses

An in-line electronic strut monitor for a temporary support strut, comprising:
  a housing having a first end with a first bore extending into the housing and a second end spaced apart from the first end along an axial length;
  a first coupling mechanism at the first end configured to removably couple the first end of the housing to a first end of a temporary support strut;
  a second coupling mechanism at the second end of the housing, the second coupling mechanism comprising a cylindrical shaft with a circumferential channel configured to be received into a corresponding bore of an external attachment structure;
  a third coupling mechanism positioned on a sidewall that extends along a portion of the housing between the first end and the second end;
  a monitoring device positioned within the housing, the monitoring device comprising a load cell configured to measure at least a portion of a force exerted upon the first coupling mechanism by the removably coupled temporary support strut; and an electronic interface, configured to communicate information about the force measured by the load cell to a user.

The in-line electronic strut monitor of clause 1, wherein the sidewall is a first sidewall, and the housing further comprises a second sidewall and a third sidewall, the in-line electronic monitor further comprising a first handle structure rigidly coupled to the second sidewall, and a second handle structure rigidly coupled to the third sidewall.

The in-line electronic strut monitor of clause 2, wherein the electronic interface comprises an electronic display attached to a fourth sidewall of the housing.

The in-line electronic strut monitor of clause 3, wherein the first and second handle structures each comprise a closed-loop structure additionally configured to prevent the electronic display from being accidentally impacted by an external surface.

The in-line electronic strut monitor of clause 1, wherein the electronic interface comprises a wireless transceiver configured to transmit sensor information to a remote device of the user.

The in-line electronic strut monitor of clause 1, wherein the force is a compressive force.

The in-line electronic strut monitor of clause 1, wherein the monitoring device further comprises an inclination sensor configured to detect a tilt angle of the axial length of the housing.

The in-line electronic strut monitor of clause 1, wherein the monitoring device comprises a vibration sensor.

The in-line electronic strut monitor of clause 1, wherein the monitoring device comprises an alarm configured with audible and visible alert indicators.

The in-line electronic strut monitor of clause 1, wherein the first coupling mechanism comprises a spring-loaded catch configured to extend from a sidewall of the housing into the bore, and configured to be received into a channel of the first end of the temporary support strut.

The in-line electronic strut monitor of clause 1, wherein the third coupling mechanism is similar to the first coupling mechanism.

The in-line electronic strut monitor of clause 1, wherein the third coupling mechanism is similar to the second coupling mechanism.

An in-line electronic strut monitor for a temporary support strut, comprising:
- a housing having a first end with a first bore extending into the housing and a second end spaced apart from the first end along an axial length;
- a first coupling mechanism at the first end configured to removably couple the first end of the housing to a first end of a temporary support strut;
- a second coupling mechanism at the second end of the housing, the second coupling mechanism comprising a cylindrical shaft with a circumferential channel configured to be received into a corresponding bore of an external attachment structure;
- a monitoring device positioned within the housing, the monitoring device comprising a load cell configured to measure at least a portion of a force exerted upon the first coupling mechanism by the removably coupled temporary support strut; and
- an electronic interface, configured to communicate information about the force measured by the load cell to a user.

The in-line electronic strut monitor of clause 13, wherein the sidewall is a first sidewall, and the housing further comprises a second sidewall and a third sidewall, the in-line electronic monitor further comprising a first handle structure rigidly coupled to the second sidewall, and a second handle structure rigidly coupled to the third sidewall.

The in-line electronic strut monitor of clause 14, wherein the electronic interface comprises an electronic display attached to a fourth sidewall of the housing.

The in-line electronic strut monitor of clause 15, wherein the first and second handle structures each comprise a closed-loop structure additionally configured to prevent the electronic display from being accidentally impacted by an external surface.

The in-line electronic strut monitor of clause 13, wherein the electronic interface comprises a wireless transceiver configured to transmit sensor information to a remote device of the user.

The in-line electronic strut monitor of clause 13, wherein the force is a compressive force.

The in-line electronic strut monitor of clause 13, wherein the monitoring device further comprises an inclination sensor configured to detect a tilt angle of the axial length of the housing.

The in-line electronic strut monitor of clause 13, wherein the monitoring device comprises a vibration sensor.

An in-line electronic strut monitor for a support strut, comprising:
- a housing configured to be removably coupled to a support strut;
- a monitoring device positioned within the housing, the monitoring device further comprising:
  - a processor;
  - a non-transitory computer-readable medium comprising computer-executable instructions that, when executed by the processor, are configured to:
    - identify a strut type and strut length to be used to shore a structure;
    - identify a maximum permissible load for the identified strut type and strut length;
    - set a threshold load equal to the identified maximum permissible load;
    - monitor a current load acting upon the housing as the support strut is being installed to shore the structure; and
    - activate an alarm if the current load exceeds the maximum permissible load.

The in-line electronic strut monitor of clause 21, wherein at least one of the strut type and strut length is automatically identified by the monitoring device using information received from a beacon coupled to the support strut.

The in-line electronic strut monitor of clause 22, wherein the beacon is an RFID tag.

The in-line electronic strut monitor of clause 21, wherein at least one of the strut type and strut length is identified from information entered manually into the in-line electronic strut monitor.

The in-line electronic strut monitor of clause 21, wherein the alarm comprises a signal transmitted from the monitoring device to an external device.

The in-line electronic strut monitor of clause 21, wherein the alarm comprises an audible or visible signal emitted from the electronic strut monitor.

CONCLUSION

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

Accordingly, it will be understood that the invention is not to be limited to the embodiments disclosed herein, but is to be understood from the following claims, which are to be interpreted as broadly as allowed under the law.

We claim:

1. An electronic monitor, comprising:
   a housing having a first end with a first bore extending into the housing and a second end spaced apart from the first end along an axial length;
   a first coupling mechanism at the first end;
   a second coupling mechanism at the second end of the housing, the second coupling mechanism comprising a cylindrical shaft with a circumferential channel;
   a third coupling mechanism positioned on a sidewall that extends along a portion of the housing between the first end and the second end, wherein the sidewall is a first sidewall, and the housing further comprises a second sidewall and a third sidewall, the electronic monitor further comprising a first handle structure rigidly coupled to the second sidewall, and a second handle structure rigidly coupled to the third sidewall;
   a monitoring device positioned within the housing, the monitoring device comprising a load cell sensor and a vibration sensor; and
   an electronic interface, configured to communicate information from the monitoring device to a user, wherein the first and second handle structures each comprise a closed-loop structure additionally configured to prevent the electronic interface from being accidentally impacted by an external surface.

2. The electronic monitor of claim 1, wherein the first coupling mechanism is configured to removably couple the first end of the housing to a temporary support strut.

3. The electronic monitor of claim 2, wherein the monitoring device is configured to measure at least a portion of a force exerted upon the first coupling mechanism by the temporary support strut.

4. The electronic monitor of claim 2, wherein the first coupling mechanism comprises a spring-loaded catch configured to extend from the sidewall of the housing into the bore, and configured to be received into a channel of the first end of the temporary support strut.

5. The electronic monitor of claim 1, wherein the second coupling mechanism or the third coupling mechanism is configured to be removably coupled to an external attachment structure.

6. The electronic monitor of claim 1, wherein the electronic interface comprises an electronic display attached to a fourth sidewall of the housing.

7. The electronic monitor of claim 1, wherein the electronic interface comprises a wireless transceiver configured to transmit sensor information to a remote device of the user.

8. The electronic monitor of claim 1, wherein the monitoring device further comprises an inclination sensor configured to detect a tilt angle of the axial length of the housing.

9. The electronic monitor of claim 1, wherein the monitoring device comprises an alarm configured with audible and visible alert indicators.

10. An electronic monitor, comprising:
    a housing having a first end with a bore extending into the housing and a second end spaced apart from the first end along an axial length, wherein the housing further comprises a first sidewall, a second sidewall and a third sidewall, the electronic monitor further comprising a first handle structure rigidly coupled to the second sidewall, and a second handle structure rigidly coupled to the third sidewall;
    a first coupling mechanism at the first end configured to removably couple the first end of the housing to a temporary support strut;
    a second coupling mechanism at the second end of the housing, the second coupling mechanism comprising a cylindrical shaft with a circumferential channel;
    a monitoring device positioned within the housing, the monitoring device comprising a load cell configured to measure at least a portion of a force exerted upon the first coupling mechanism by the temporary support strut; and
    an electronic interface, configured to communicate to a user information about the force measured by the load cell, wherein the first and second handle structures each comprise a closed-loop structure additionally configured to prevent the electronic interface from being accidentally impacted by an external surface.

11. The electronic monitor of claim 10, wherein the electronic interface comprises a wireless transceiver configured to transmit sensor information to a remote device of the user.

12. The electronic monitor of claim 10, wherein the monitoring device further comprises an inclination sensor configured to detect a tilt angle of the axial length of the housing.

13. The electronic monitor of claim 10, wherein the monitoring device comprises a vibration sensor.

14. An electronic monitor, comprising:
    a housing configured to be removably coupled to a support strut, wherein the housing further comprises a first sidewall, a second sidewall and a third sidewall, the electronic monitor further comprising a first handle structure rigidly coupled to the second sidewall, and a second handle structure rigidly coupled to the third sidewall, wherein the first and second handle structures each comprise a closed-loop structure additionally configured to prevent an electronic interface from being accidentally impacted by an external surface;
    a monitoring device positioned within the housing, the monitoring device further comprising:
    a processor;
    a non-transitory computer-readable medium comprising computer-executable instructions that, when executed by the processor, are configured to:
        identify a strut type and a strut length to be used to shore a structure;
        identify a maximum permissible load for the identified strut type and the identified strut length;
        set a threshold load equal to the identified maximum permissible load;
        monitor a current load acting upon the housing as the support strut is being installed to shore the structure; and
        activate an alarm when the current load exceeds the maximum permissible load.

15. The electronic monitor of claim 14, wherein at least one of the strut type and the strut length is automatically identified by the monitoring device using information received from a beacon coupled to the support strut.

16. The electronic monitor of claim 15, wherein the beacon is an RFID tag.

17. The electronic monitor of claim 15, wherein at least one of the strut type and the strut length is identified from information entered manually into the electronic monitor.

18. The electronic monitor of claim 14, wherein the alarm comprises a signal transmitted from the monitoring device to an external device.

* * * * *